United States Patent
Kanai et al.

(10) Patent No.: US 8,836,846 B2
(45) Date of Patent: Sep. 16, 2014

(54) ZOOM LENS AND IMAGING APPARATUS

(71) Applicant: Sony Corporation, Tokyo (JP)

(72) Inventors: Makoto Kanai, Tokyo (JP); Motoyuki Otake, Saitama (JP); Masaharu Hosoi, Kanagawa (JP); Toshihiro Sunaga, Kanagawa (JP); Masaki Maruyama, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/777,350

(22) Filed: Feb. 26, 2013

(65) Prior Publication Data

US 2013/0235251 A1    Sep. 12, 2013

(30) Foreign Application Priority Data

Mar. 9, 2012   (JP) ................................. 2012-052721

(51) Int. Cl.
*H04N 5/225* (2006.01)
*G02B 15/177* (2006.01)
*G02B 13/04* (2006.01)
*G02B 15/14* (2006.01)

(52) U.S. Cl.
CPC ................... *G02B 13/04* (2013.01); *G02B 15/177* (2013.01)
USPC ............................ 348/340; 359/676; 359/686

(58) Field of Classification Search
USPC ............................ 348/340; 359/676, 771, 686
See application file for complete search history.

(56) References Cited

U.S. PATENT DOCUMENTS

| | | | | |
|---|---|---|---|---|
| 5,543,969 | A * | 8/1996 | Ito | 359/690 |
| 6,075,653 | A * | 6/2000 | Narimatsu et al. | 359/686 |
| 7,800,829 | B2 * | 9/2010 | Iwasawa | 359/676 |
| 8,564,711 | B2 * | 10/2013 | Morooka et al. | 348/345 |
| 2005/0219709 | A1 * | 10/2005 | Wakazono | 359/686 |
| 2012/0188436 | A1 * | 7/2012 | Ozaki | 348/345 |

FOREIGN PATENT DOCUMENTS

| | | |
|---|---|---|
| JP | 2006-208889 | 8/2006 |
| JP | 2010-122457 | 6/2010 |

* cited by examiner

*Primary Examiner* — Ngoc-Yen Vu
(74) *Attorney, Agent, or Firm* — Rader, Fishman & Grauer PLLC

(57) ABSTRACT

A zoom lens includes: first, second, third and fourth lens groups having negative power, positive power, negative power and positive power, respectively, and sequentially arranged from an object side toward an image side. When the magnification at a wide angle side is changed to the magnification at a telescopic side, the first lens group is so moved along an optical axis that the distance between the first lens group and the second lens group decreases, and the second third and fourth lens groups are moved from the image side toward the object side, the third lens group is moved along the optical axis for focusing, and the zoom lens satisfies the following conditional expression (1)

$$-2.0 < f3/\sqrt{(fw \times ft)} < -0.3 \tag{1}$$

where f3, fw and ft represent the focal lengths of the third lens group, the entire lens system at the wide angle end, and the entire lens system at the telescopic end, respectively.

20 Claims, 21 Drawing Sheets

ZOOM LENS AND IMAGING APPARATUS

FIELD

The present technology relates to a zoom lens and an imaging apparatus, particularly to a technical field of a zoom lens suitable for a digital still camera, a digital video camcorder, and other digital input/output apparatus, particularly, an interchangeable-lens-type digital camera, and of an imaging apparatus with the zoom lens.

BACKGROUND

In recent years, interchangeable-lens-type digital cameras have become popular at a rapid pace. The widespread use of such cameras results from the following two backgrounds: user's need for a substitute for a single lens reflex camera of related art; and a greatly increasing demand from users who wish to upgrade from their compact digital still cameras.

An interchangeable-lens-type digital camera accommodates an imaging device larger than that in a compact digital still camera, and users therefore expect higher image quality resulting from effective use of the large imaging device. To this end, a zoom lens having excellent imaging performance is typically essentially required.

On the other hand, many users desire that a zoom lens to be used with a digital camera of the type described above provides excellent convenience. Specifically, users strongly demand a zoom lens capable of handling a variety of imaging conditions, capable of smooth focusing, which is suitable for motion-picture imaging, and being compact, particularly compact to carry.

As an interchangeable lens suitable for size reduction, there is a known two-group zoom lens formed of a first lens group having negative power and a second lens group having positive power sequentially arranged from the object side toward the image side.

Further, a compact digital camera, which is typically required to be more compact, also uses a three-group zoom lens including a third lens group having positive power and located on the image side as well as the two groups described above (see JP-A-2010-122457, for example).

Moreover, as a zoom lens suitable for autofocusing in motion-picture imaging, there is a proposed four-group zoom lens formed of a first lens group having negative power, a second lens group having positive power, a third lens group having negative power, and a fourth lens group having positive power sequentially arranged from the object side toward the image side (see JP-A-2006-208889, for example).

SUMMARY

In the two-group zoom lens described above, however, which moves the large, heavy first lens group for focusing, an actuator for the focusing operation inevitably needs to be large.

The large actuator prevents size reduction of the zoom lens and produces large amounts of vibration and noise when moving the heavy lens group at high speed, making the zoom lens not suitable for motion-picture imaging.

In the three-group zoom lens described in JP-A-2010-122457, in which the first lens group or the third lens group can be used as a focusing lens group, the third lens group, which is less sensitive to decentering and can be formed of a smaller number of lenses than the first lens group, is used as the focusing lens group in many cases.

In a compact digital still camera using a small imaging device, the size and weight of a third lens group cause no problem, whereas in an exchangeable lens using a large imaging device, a third lens group is large and heavy. Further, a zoom lens having a negative/positive/positive three-group configuration, in which a third lens group has too small a longitudinal magnification, typically requires a long focusing stroke, and it is therefore necessary to drive the heavy third lens group over a long travel for focusing, inevitably resulting in an increase in the size of an actuator for focusing operation and an increase in the total length of the zoom lens.

In the four-group zoom lens described in JP-A-2006-208889, in which the third lens group is very compact because the third lens group is used as a focusing lens group, a high-speed, quiet, small actuator for focusing operation can be used.

However, since the fourth lens group is fixed or located in a position close to the image plane when the zoom lens operates at the telescopic end, high-height light rays are incident on the fourth lens group, resulting in a large diameter of each lens that forms the fourth lens group. In particular, in an interchangeable lens, since the diameter of a mount that is attached to a camera body is fixed to a predetermined size, a lens positioned in the vicinity of the mount is typically required to be small in order to prevent interference with the mount.

It is therefore desirable to provide a zoom lens and an imaging apparatus that solve the problems described above and are capable not only of ensuring excellent imaging performance and high-speed, smooth focusing performance suitable for motion-picture imaging but also of achieving compactness.

An embodiment of the present technology is directed to a zoom lens including a first lens group having negative power, a second lens group having positive power, a third lens group having negative power, and a fourth lens group having positive power sequentially arranged from an object side toward an image side, wherein when the magnification at a wide angle side is changed to the magnification at a telescopic side, the first lens group is so moved along an optical axis that the distance between the first lens group and the second lens group decreases, and the second lens group, the third lens group, and the fourth lens group are moved from the image side toward the object side, the third lens group is moved along the optical axis for focusing, and the zoom lens satisfies the following conditional expression (1):

$$-2.0 < f3/\sqrt{(fw \times ft)} < -0.3 \tag{1}$$

where f3 represents the focal length of the third lens group, fw represents the focal length of the entire lens system at the wide angle end, and ft represents the focal length of the entire lens system at the telescopic end.

Therefore, in the zoom lens, the power of the third lens group becomes appropriate and the focusing stroke is shortened.

It is preferable that the zoom lens described above satisfies the following conditional expression (2):

$$0.5 < m4/m3 < 1.0 \tag{2}$$

where m3 represents the amount over which the third lens group travels when the magnification at the wide angle end is changed to the magnification at the telescopic end, and m4 represents the amount over which the fourth lens group travels when the magnification at the wide angle end is changed to the magnification at the telescopic end.

When the zoom lens satisfies the conditional expression (2), the travel of the fourth lens group relative to the third lens group becomes appropriate.

In the zoom lens described above, it is preferable that the third lens group is formed of a single lens having at least one aspheric surface.

When the third lens group is formed of a single lens having at least one aspheric surface, the single lens is moved along the optical axis for focusing.

It is preferable that the zoom lens described above satisfies the following conditional expression (3):

$$0.2<m2/ft<0.7 \quad (3)$$

where m2 represents the amount over which the second lens group travels when the magnification at the wide angle end is changed to the magnification at the telescopic end.

When the zoom lens satisfies the conditional expression (3), the travel of the second lens group becomes appropriate.

In the zoom lens described above, it is preferable that the first lens group is formed of a negative lens and a positive lens sequentially arranged from the object side toward the image side.

When the first lens group is formed of a negative lens and a positive lens sequentially arranged from the object side toward the image side, the number of lenses necessary to ensure satisfactory optical performance of the first lens group is minimized.

It is preferable that the zoom lens satisfies the following conditional expressions (4) and (5):

$$n12>1.90 \quad (4)$$

$$v12<25 \quad (5)$$

where n12 represents the refractive index of the positive lens in the first lens group at the d line, and v12 represents the Abbe number of the positive lens in the first lens group at the d line.

When the zoom lens satisfies the conditional expressions (4) and (5), the curvature of the positive lens in the first lens group decreases, whereby chromatic aberrations produced in the first lens group are satisfactorily corrected.

In the zoom lens described above, it is preferable that the lower limit of the conditional expression (1) is −1.6 and the upper limit of the conditional expression (1) is −0.5.

When the lower limit of the conditional expression (1) is −1.6 and the upper limit of the conditional expression (1) is −0.5, the power of the third lens group becomes more appropriate and the focusing stroke is further shortened.

In the zoom lens described above, it is preferable that the lower limit of the conditional expression (1) is −1.2 and the upper limit of the conditional expression (1) is −0.5.

When the lower limit of the conditional expression (1) is −1.2 and the upper limit of the conditional expression (1) is −0.5, the power of the third lens group becomes still more appropriate and the focusing stroke is still further shortened.

In the zoom lens described above, it is preferable that the lower limit of the conditional expression (2) is 0.7.

When the lower limit of the conditional expression (2) is 0.7, the travel of the fourth lens group becomes more appropriate.

In the zoom lens described above, it is preferable that the lower limit of the conditional expression (3) is 0.3 and the upper limit of the conditional expression (3) is 0.5.

When the lower limit of the conditional expression (3) is 0.3 and the upper limit of the conditional expression (3) is 0.5, the travel of the second lens group becomes more appropriate.

Another embodiment of the present technology is directed to an imaging apparatus including a zoom lens and an imaging device that converts an optical image formed by the zoom lens into an electric signal, wherein the zoom lens includes a first lens group having negative power, a second lens group having positive power, a third lens group having negative power, and a fourth lens group having positive power sequentially arranged from an object side toward an image side, when the magnification at a wide angle side is changed to the magnification at a telescopic side, the first lens group is so moved along an optical axis that the distance between the first lens group and the second lens group decreases, and the second lens group, the third lens group, and the fourth lens group are moved from the image side toward the object side, the third lens group is moved along the optical axis for focusing, and the zoom lens satisfies the following conditional expression (1):

$$-2.0<f3/\sqrt{(fw \times ft)}<-0.3 \quad (1)$$

where f3 represents the focal length of the third lens group, fw represents the focal length of the entire lens system at the wide angle end, and ft represents the focal length of the entire lens system at the telescopic end.

Therefore, in the zoom lens of the imaging apparatus, the power of the third lens group becomes appropriate and the focusing stroke is shortened.

The zoom lens according to the embodiment of the present technology includes a first lens group having negative power, a second lens group having positive power, a third lens group having negative power, and a fourth lens group having positive power sequentially arranged from an object side toward an image side, and when the magnification at a wide angle side is changed to the magnification at a telescopic side, the first lens group is so moved along an optical axis that the distance between the first lens group and the second lens group decreases, and the second lens group, the third lens group, and the fourth lens group are moved from the image side toward the object side, and the third lens group is moved along the optical axis for focusing. The zoom lens further satisfies the following conditional expression (1):

$$-2.0<f3/\sqrt{(fw \times ft)}<-0.3 \quad (1)$$

where f3 represents the focal length of the third lens group, fw represents the focal length of the entire lens system at the wide angle end, and ft represents the focal length of the entire lens system at the telescopic end.

Therefore, not only can satisfactory imaging performance and high-speed, smooth focusing performance suitable for motion picture imaging be ensured, but also size reduction can be achieved.

In one preferred embodiment of the present technology described above, the zoom lens satisfies the following conditional expression (2):

$$0.5<m4/m3<1.0 \quad (2)$$

where m3 represents the amount over which the third lens group travels when the magnification at the wide angle end is changed to the magnification at the telescopic end, and m4 represents the amount over which the fourth lens group travels when the magnification at the wide angle end is changed to the magnification at the telescopic end.

The travel of the fourth lens group therefore becomes appropriate, whereby a necessary focusing stroke can be provided and size reduction can be achieved at the same time.

In one preferred embodiment of the present technology described above, the third lens group is formed of a single lens having at least one aspheric surface.

Therefore, since the third lens group is a focusing lens group, a focusing drive mechanism and a lens holding structure can be reduced in size.

In one preferred embodiment of the present technology described above, the zoom lens satisfies the following conditional expression (3):

$$0.2 < m2/ft < 0.7 \quad (3)$$

where m2 represents the amount over which the second lens group travels when the magnification at the wide angle end is changed to the magnification at the telescopic end.

Therefore, spherical and coma aberrations produced in the second lens group can be satisfactorily corrected, and high-volume productivity can be ensured because the sensitivity to decentering decreases. The size of the entire lens system can also be reduced.

In one preferred embodiment of the present technology described above, the first lens group is formed of a negative lens and a positive lens sequentially arranged from the object side toward the image side.

The optical performance can be improved and size reduction can therefore be achieved by forming the first lens group with a negative lens and a positive lens so that the number of lenses that form the first lens group is minimized.

In one preferred embodiment of the present technology described above, the zoom lens satisfies the following conditional expressions (4) and (5):

$$n12 > 1.90 \quad (4)$$

$$v12 < 25 \quad (5)$$

where n12 represents the refractive index of the positive lens in the first lens group at the d line, and v12 represents the Abbe number of the positive lens in the first lens group at the d line.

Therefore, the optical performance can be improved and the zoom lens can be readily manufactured.

In one preferred embodiment of the present technology described above, the lower limit of the conditional expression (1) is −1.6 and the upper limit of the conditional expression (1) is −0.5.

Therefore, not only can more satisfactory imaging performance and higher-speed, smoother focusing performance suitable for motion picture imaging be ensured, but also further size reduction can be achieved.

In one preferred embodiment of the present technology described above, the lower limit of the conditional expression (1) is −1.2 and the upper limit of the conditional expression (1) is −0.5.

Therefore, not only can still more satisfactory imaging performance and still higher-speed, smoother focusing performance suitable for motion picture imaging be ensured, but also still further size reduction can be achieved.

In one preferred embodiment of the present technology described above, the lower limit of the conditional expression (2) is 0.7.

The travel of the fourth lens group therefore becomes more appropriate, whereby a necessary focusing stroke can be provided and further size reduction can be achieved at the same time.

In one preferred embodiment of the present technology described above, the lower limit of the conditional expression (3) is 0.3 and the upper limit of the conditional expression (3) is 0.5.

Therefore, spherical and coma aberrations produced in the second lens group can be more satisfactorily corrected, and high-volume productivity can be ensured because the sensitivity to decentering further decreases. The size of the entire lens system can also be further reduced.

The imaging apparatus according to the embodiment of the present technology includes a zoom lens and an imaging device that converts an optical image formed by the zoom lens into an electric signal. The zoom lens includes a first lens group having negative power, a second lens group having positive power, a third lens group having negative power, and a fourth lens group having positive power sequentially arranged from an object side toward an image side. When the magnification at a wide angle side is changed to the magnification at a telescopic side, the first lens group is so moved along an optical axis that the distance between the first lens group and the second lens group decreases, and the second lens group, the third lens group, and the fourth lens group are moved from the image side toward the object side, and the third lens group is moved along the optical axis for focusing. The zoom lens further satisfies the following conditional expression (1):

$$-2.0 < f3/\sqrt{(fw \times ft)} < -0.3 \quad (1)$$

where f3 represents the focal length of the third lens group, fw represents the focal length of the entire lens system at the wide angle end, and ft represents the focal length of the entire lens system at the telescopic end.

Therefore, not only can satisfactory imaging performance and high-speed, smooth focusing performance suitable for motion picture imaging be ensured, but also size reduction can be achieved.

DETAILED DESCRIPTION

Figure 1:
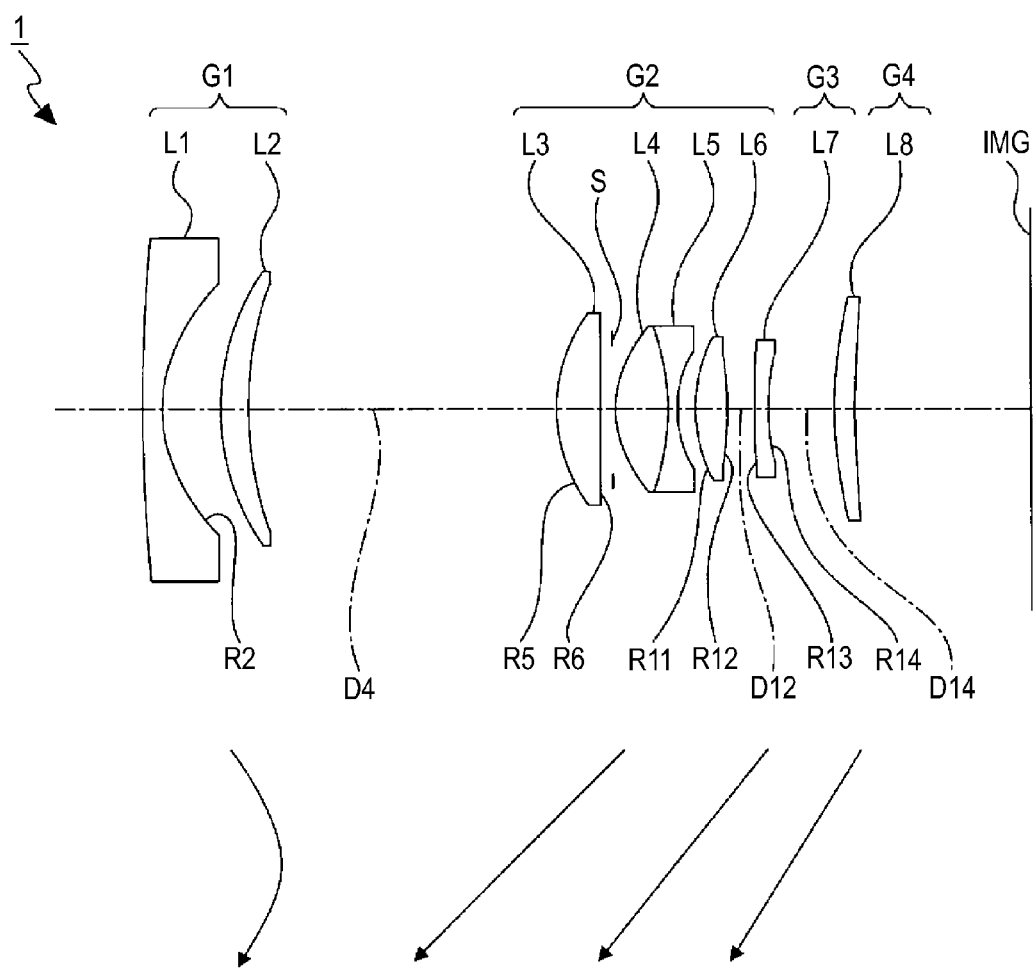
FIG. 1, along with FIGS. 2 to 21, shows an embodiment for implementing a zoom lens and an imaging apparatus according to the present technology and shows the lens configuration of a zoom lens according to Example 1.

Embodiments for implementing a zoom lens and an imaging apparatus according to the present technology will be described below.

[Configuration of Zoom Lens]

A zoom lens according to an embodiment of the present technology is formed of a first lens group having negative power, a second lens group having positive power, a third lens group having negative power, and a fourth lens group having positive power sequentially arranged from the object side toward the image side.

In the zoom lens according to the embodiment of the present technology, when the magnification at the wide angle side is changed to the magnification at the telescopic side, the first lens group is so moved along the optical axis that the distance between the first lens group and the second lens group decreases, and the second lens group, the third lens group, and the fourth lens group are moved from the image side toward the object side; and the third lens group is moved along the optical axis for focusing.

Moving the third lens group for focusing as described above allows size reduction of an entire focusing group including an actuator for focusing operation because the third lens group is a small-diameter lens group on which low-height light rays are incident in positions close to the optical axis.

The zoom lens according to the embodiment of the present technology further satisfies the following conditional expression (1):

$$-2.0 < f3/\sqrt{(fw \times ft)} < -0.3 \quad (1)$$

where f3 represents the focal length of the third lens group, fw represents the focal length of the entire lens system at a wide angle end, and ft represents the focal length of the entire lens system at a telescopic end.

The conditional expression (1) defines the focal length of the third lens group.

When $f3/\sqrt{(fw \times ft)}$ is smaller than the lower limit of the conditional expression (1), the power of the third lens group becomes too small, resulting in an increase in the focusing stroke and hence an increase in the total optical length. In particular, in a collapsible-type imaging apparatus, the total length thereof increases in a state in which the zoom lens is retracted and no size reduction is achieved.

Further, when the focusing stroke of the third lens group increases, it is necessary to increase the drive force of the actuator for focusing operation, resulting in an increase in the size of the actuator for focusing operation, which prevents size reduction of the entire focusing group including the actuator for focusing operation.

Conversely, when $f3/\sqrt{(fw \times ft)}$ is greater than the upper limit of the conditional expression (1), the negative power of the third lens group becomes too large, it is difficult to correct aberrations produced in the third lens group.

Further, when $f3/\sqrt{(fw \times ft)}$ is greater than the upper limit of the conditional expression (1), the sensitivity to decentering increases, resulting in a decrease in high-volume productivity.

Moreover, when $f3/\sqrt{(fw \times ft)}$ is greater than the upper limit of the conditional expression (1), what is called focusing sensitivity, which is the travel of an image on the image plane with respect to the travel of the third lens group along the optical axis, becomes too high, resulting in a difficulty in performing focusing control that satisfies necessary focusing precision.

As described above, when the zoom lens satisfies the conditional expression (1), not only can satisfactory imaging performance and high-speed, smooth focusing performance suitable for motion picture imaging be ensured but also size reduction can be achieved.

In the present technology, the numerical range of the conditional expression (1) is more preferably changed to the range of the following conditional expression (1)':

$$-1.6 < f3/\sqrt{(fw \times ft)} < -0.5 \quad (1')$$

When the range of the conditional expression (1)' is satisfied, more satisfactory imaging performance and higher-speed, smoother focusing performance suitable for motion picture imaging can be ensured and further size reduction can be achieved.

In the present technology, the numerical range of the conditional expression (1) is still more preferably changed to the range of the following conditional expression (1)'':

$$-1.2 < f3/\sqrt{(fw \times ft)} < -0.5. \quad (1'')$$

When the range of the conditional expression (1)'' is satisfied, still more satisfactory imaging performance and still higher-speed, smoother focusing performance suitable for motion picture imaging can be ensured and still greater size reduction can be achieved.

A zoom lens according to an embodiment of the present technology desirably satisfies the following conditional expression (2):

$$0.5 < m4/m3 < 1.0 \quad (2)$$

where m3 represents the amount over which the third lens group travels when the magnification at the wide angle end is changed to the magnification at the telescopic end, and m4 represents the amount over which the fourth lens group travels when the magnification at the wide angle end is changed to the magnification at the telescopic end.

The conditional expression (2) defines the ratio between the amount over which the third lens group travels and the amount over which the fourth lens group travels when the magnification at the wide angle end is changed to the magnification at the telescopic end.

When m4/m3 is smaller than the lower limit of the conditional expression (2), the travel of the fourth lens group is too short, resulting in an increase in the height of each light ray passing through the fourth lens group at the telescopic end. In this case, the effective diameter of the fourth lens group increases, which prevents size reduction. In particular, in an interchangeable lens, since the diameter of a mount that is attached to a camera body is fixed to a predetermined size, an increase in the effective diameter of the fourth lens group makes it difficult to prevent interference between the fourth lens group and the mount.

Conversely, when m4/m3 is greater than the upper limit of the conditional expression (2), the travel of the fourth lens group becomes too long, resulting in a decrease in the distance between the third lens group and the fourth lens group at the telescopic end, which makes it difficult to provide a necessary focusing stroke.

As described above, when the zoom lens satisfies the conditional expression (2), the travel of the fourth lens group becomes appropriate, whereby a necessary focusing stroke can be provided and size reduction can be achieved at the same time.

In the present technology, the numerical range of the conditional expression (2) is more preferably changed to the range of the following conditional expression (2)':

$$0.7 < m4/m3 < 1.0. \tag{2}'$$

When the range of the conditional expression (2)' is satisfied, further size reduction is achieved while a necessary focusing stroke is provided.

In a zoom lens according to an embodiment of the present technology, the third lens group is desirably formed of a single lens having at least one aspheric surface.

Forming the third lens group, which is the focusing lens group, with a single lens allows a focusing drive mechanism and a lens holding structure to be reduced in size.

On the other hand, when the third lens group, which has large negative power, is formed of a single lens, it is difficult to satisfactorily correct variations in aberrations, particularly, variation in spherical aberration and variation in the position of the image plane, at the time of focusing. The variations in the aberrations described above can, however, be effectively corrected by forming at least one surface of the third lens group with an aspheric surface.

A zoom lens according to an embodiment of the present technology desirably satisfies the following conditional expression (3):

$$0.2 < m2/ft < 0.7 \tag{3}$$

where m2 represents the amount over which the second lens group travels when the magnification at the wide angle end is changed to the magnification at the telescopic end.

The conditional expression (3) defines the amount over which the second lens group travels along the optical axis when the magnification at the wide angle end is changed to the magnification at the telescopic end.

When m2/ft is smaller than the lower limit of the conditional expression (3), the travel of the second lens group becomes too short. In this case, it is necessary to greatly increase the positive power of the second lens group in order to achieve a desired zoom magnification ratio. It is therefore difficult to satisfactorily correct spherical and coma aberrations produced in the second lens group, and the sensitivity to decentering also greatly increases, resulting in degradation in high-volume productivity.

Conversely, when m2/ft is greater than the upper limit of the conditional expression (3), the travel of the second lens group becomes too long, which prevents size reduction of the entire lens system. In particular, in a collapsible-type imaging apparatus, the total optical length increases, and hence no size reduction is achieved.

As described above, when the zoom lens satisfies the conditional expression (3), spherical and coma aberrations produced in the second lens group can be satisfactorily corrected and high-volume productivity can be ensured because the sensitivity to decentering decreases. The size of the entire lens system can also be reduced.

In the present technology, the numerical range of the conditional expression (3) is more preferably changed to the range of the following conditional expression (3)':

$$0.3 < m2/ft < 0.5. \tag{3}'$$

When the range of the conditional expression (3)' is satisfied, spherical and coma aberrations produced in the second lens group can be more satisfactorily corrected and high-volume productivity can be ensured because the sensitivity to decentering further decreases. The size of the entire lens system can also be further reduced.

In a zoom lens according to an embodiment of the present technology, the first lens group is desirably formed of a negative lens and a positive lens sequentially arranged from the object side toward the image side.

The first lens group desirably has negative power and includes a positive lens for correcting field curvature, distortion, chromatic aberrations, and other aberrations, and the optical performance can be improved and size reduction can be achieved by forming the first lens group with a negative lens and a positive lens so that the number of lenses that form the first lens group is minimized. In particular, in a collapsible-type imaging apparatus, the total optical length can be shortened.

A zoom lens according to an embodiment of the present technology desirably satisfies the following conditional expressions (4) and (5):

$$n12 > 1.90 \tag{4}$$

$$v12 < 25 \tag{5}$$

where n12 represents the refractive index of the positive lens in the first lens group at the d line, and v12 represents the Abbe number of the positive lens in the first lens group at the d line.

The conditional expressions (4) and (5) define the refractive index and the Abbe number of the positive lens in the first lens group.

When n12 does not fall within the range of the conditional expression (4), it is necessary to increase the curvature of the positive lens in the first lens group. In this case, it is difficult to correct filed curvature at the wide angle end, resulting in degradation in optical performance, and it is difficult to ensure an enough edge thickness, resulting in an increase in difficulty in lens manufacturing.

When v12 does not fall within the range of the conditional expression (5), it is difficult to correct chromatic aberrations produced in the first lens group, resulting in degradation in optical performance.

As described above, when the zoom lens satisfies the conditional expressions (4) and (5), the optical performance can be improved and the zoom lens can be readily manufactured.

Among the first to fourth lens groups in the zoom lens, one lens group or part of one lens group can be shifted in a direction substantially perpendicular to the optical axis to correct an image blur.

As described above, the zoom lens can also function as an anti-vibration optical system that corrects an image blur by moving a lens group or part thereof in a direction substantially perpendicular to the optical axis as described above and combining a detection system that detects an image blur, a drive system that shifts each of the lens groups, and a control system that provides the drive system with the amount of shift based on an output from the detection system. In particular, a zoom lens according to an embodiment of the present technology can correct an image blur with an accompanying small amount of aberration variation by moving the entire second lens group or part thereof in a direction substantially perpendicular to the optical axis.

[Numerical Example of Zoom Lens]

Specific examples of the zoom lenses according to the embodiments of the present technology and numerical examples in which specific values are used in the examples will be described below with reference to the drawings and tables.

The meanings of the symbols shown in the following tables and descriptions and other information on the symbols are as follows.

"Si" denotes a surface number of an i-th surface counted from the object side toward the image side. "Ri" denotes the paraxial radius of curvature of an i-th surface. "Di" denotes an on-axis inter-surface distance (central thickness of lens or air separation between lenses) between an i-th surface and an (i+1)-th surface. "Ni" denotes the refractive index of a lens or any other optical component having an i-th surface as a front surface at the d line (λ=587.6 nm). "vi" denotes the Abbe number of a lens or any other optical component having an i-th surface as a front surface at the d line.

In the field of "Si", "ASP" indicates that the surface is an aspheric surface. In the field of "Ri", "INFINITY" indicates that the surface is a flat surface. In the field of "Di", "VARIABLE" indicates a variable distance and "BF" indicates a back focal length.

"κ" denotes a conic constant, and "A4", "A6", "A8", and "A10" denote fourth, sixth, eighth, and tenth aspheric coefficients, respectively.

"f" denotes a focal length. "Fno" denotes an f-number. "ω" denotes a half viewing angle.

In each of the followings tables showing the aspheric coefficients, "E-n" represents exponential notation using a base of 10, that is, "$10^{-n}$." For example, "0.12345E-05" represents "$0.12345 \times 10^{-5}$."

Some zoom lenses used in the following examples have an aspheric lens surface. The shape of an aspheric surface is defined by the following Expression 1 with the following definitions: "x" denotes the distance from the vertex of the lens surface along the optical axis (the amount of sag); "y" denotes the height in the direction perpendicular to the optical axis direction (image height); "c" denotes the paraxial curvature (reciprocal of radius of curvature) at the vertex of the lens surface; "κ" denotes the conic constant; and "Ai" denotes the i-th aspheric coefficient.

$$x = \frac{y^2 \cdot c}{1 + \{1 - (1+\kappa) \cdot y^2 \cdot c^2\}^{\frac{1}{2}}} + \Sigma Ai \cdot y^i$$

Examples of Zoom Lens

Examples of the zoom lens will be described below.

Each zoom lens described below is formed of a first lens group G1 having negative power, a second lens group G2 having positive power, a third lens group G3 having negative power, and a fourth lens group G4 having positive power sequentially arranged from the object side toward the image side.

In each zoom lens described below, when the magnification at the wide angle side is changed to the magnification at the telescopic side, the lens groups G1 to G4 are moved as follows: the first lens group G1 is so moved along the optical axis that the distance between the first lens group G1 and the second lens group G2 decreases; the second lens group G2, the third lens group G3, and the fourth lens group G4 are moved from the image side toward the object side; and the third lens group G3 is moved along the optical axis for focusing.

Example 1

FIG. 1 shows the lens configuration of a zoom lens 1 according to Example 1 of the present technology.

The zoom lens 1 has a zoom magnification ratio set at 3.0.

The first lens group G1 is formed of a concave meniscus lens L1, which is a negative lens with a concave surface on the image side, and a convex meniscus lens L2, which is a positive lens with a convex surface on the object side, sequentially arranged from the object side toward the image side.

The second lens group G2 is formed of a biconvex lens L3, a doublet produced by bonding a biconvex lens L4 to a biconcave lens L5, and a biconvex lens L6 sequentially arranged from the object side toward the image side.

The third lens group G3 is formed of a concave meniscus lens L7 with a concave surface on the image side.

The fourth lens group G4 is formed of a convex meniscus lens L8 with a convex surface on the object side.

An aperture stop S is disposed between the biconvex lens L3 and the biconvex lens L4 in the second lens group G2.

A low-pass filter (not shown) is disposed between the fourth lens group G4 and an image plane IMG.

Table 1 shows lens data in Numerical Example 1 in which specific values are used in the zoom lens 1 according to Example 1.

TABLE 1

| Si | Ri | Di | Ni | vi |
|---|---|---|---|---|
| 1 | 133.893 | 1.500 | 1.88300 | 40.80 |
| 2 (ASP) | 12.257 | 4.420 | | |
| 3 | 18.713 | 2.090 | 2.00272 | 19.32 |
| 4 | 29.000 | VARIABLE | | |
| 5 (ASP) | 12.777 | 3.281 | 1.59201 | 67.02 |
| 6 (ASP) | −510.730 | 1.000 | | |
| 7 (APERTURE STOP) | INFINITY | 0.300 | | |
| 8 | 9.006 | 3.935 | 1.49700 | 81.61 |
| 9 | −18.926 | 0.700 | 1.83481 | 42.72 |
| 10 | 8.260 | 1.500 | | |
| 11 (ASP) | 13.209 | 2.316 | 1.59201 | 67.02 |
| 12 (ASP) | −32.001 | VARIABLE | | |
| 13 (ASP) | 32.238 | 0.973 | 1.82080 | 42.71 |
| 14 (ASP) | 13.025 | VARIABLE | | |
| 15 | 34.789 | 1.527 | 1.84666 | 23.78 |
| 16 | 68.000 | BF | | |

In the zoom lens 1, the following surfaces are aspheric surfaces: the image-side surface of the concave meniscus lens L1 in the first lens group G1 (second surface); both surfaces of the biconvex lens L3 in the second lens group G2 (fifth and sixth surfaces); both surfaces of the biconvex lens L6 in the second lens group G2 (eleventh and twelfth surfaces); and both surfaces of the concave meniscus lens L7 in the third lens group G3 (thirteenth and fourteenth surfaces).

Table 2 shows the fourth, sixth, eighth, and tenth aspheric coefficients A4, A6, A8, A10 and the conic constant κ of the aspheric surfaces in Numerical Example 1.

TABLE 2

| Si | κ | A4 | A6 | A8 | A10 |
|---|---|---|---|---|---|
| 2 | −8.57599E−01 | 3.97783E−05 | 1.08336E−07 | 3.50438E−10 | −6.55727E−13 |
| 5 | 0.00000E+00 | 3.89427E−06 | 6.45337E−07 | −1.21633E−08 | 1.67533E−10 |
| 6 | 0.00000E+00 | 1.10029E−06 | 6.40251E−07 | −1.53082E−08 | 1.70075E−10 |
| 11 | 0.00000E+00 | −2.78833E−05 | 3.72244E−06 | 1.00690E−08 | 3.24767E−09 |
| 12 | 0.00000E+00 | 4.26809E−05 | 5.96646E−06 | −6.40728E−08 | 5.51498E−09 |
| 13 | 0.00000E+00 | −7.54072E−04 | 2.20995E−05 | −3.34690E−07 | 1.06944E−09 |
| 14 | 0.00000E+00 | −7.98042E−04 | 2.30095E−05 | −4.05698E−07 | 2.27119E−09 |

When the magnification of the zoom lens 1 is changed between a wide-angle-end state and a telescopic-end state, the following inter-surface distances change: the inter-surface distance D4 between the first lens group G1 and the second lens group G2; the inter-surface distance D12 between the second lens group G2 and the third lens group G3; and the inter-surface distance D14 between the third lens group G3 and the fourth lens group G4.

Table 3 shows the variable inter-surface distances in the wide-angle-end state, an intermediate-focal-position state, and the telescopic-end state along with the f-number Fno and the half viewing angle ω in Numerical Example 1.

TABLE 3

| | Wide angle end | Intermediate focal position | Telescopic end |
|---|---|---|---|
| Fno | 3.52 | 4.42 | 5.67 |
| f | 16.32 | 26.00 | 48.50 |
| ω [°] | 43.00 | 28.95 | 16.11 |
| D4 | 23.669 | 11.859 | 1.500 |
| D12 | 2.183 | 2.932 | 6.339 |
| D14 | 5.104 | 6.012 | 6.104 |

Figure 2:
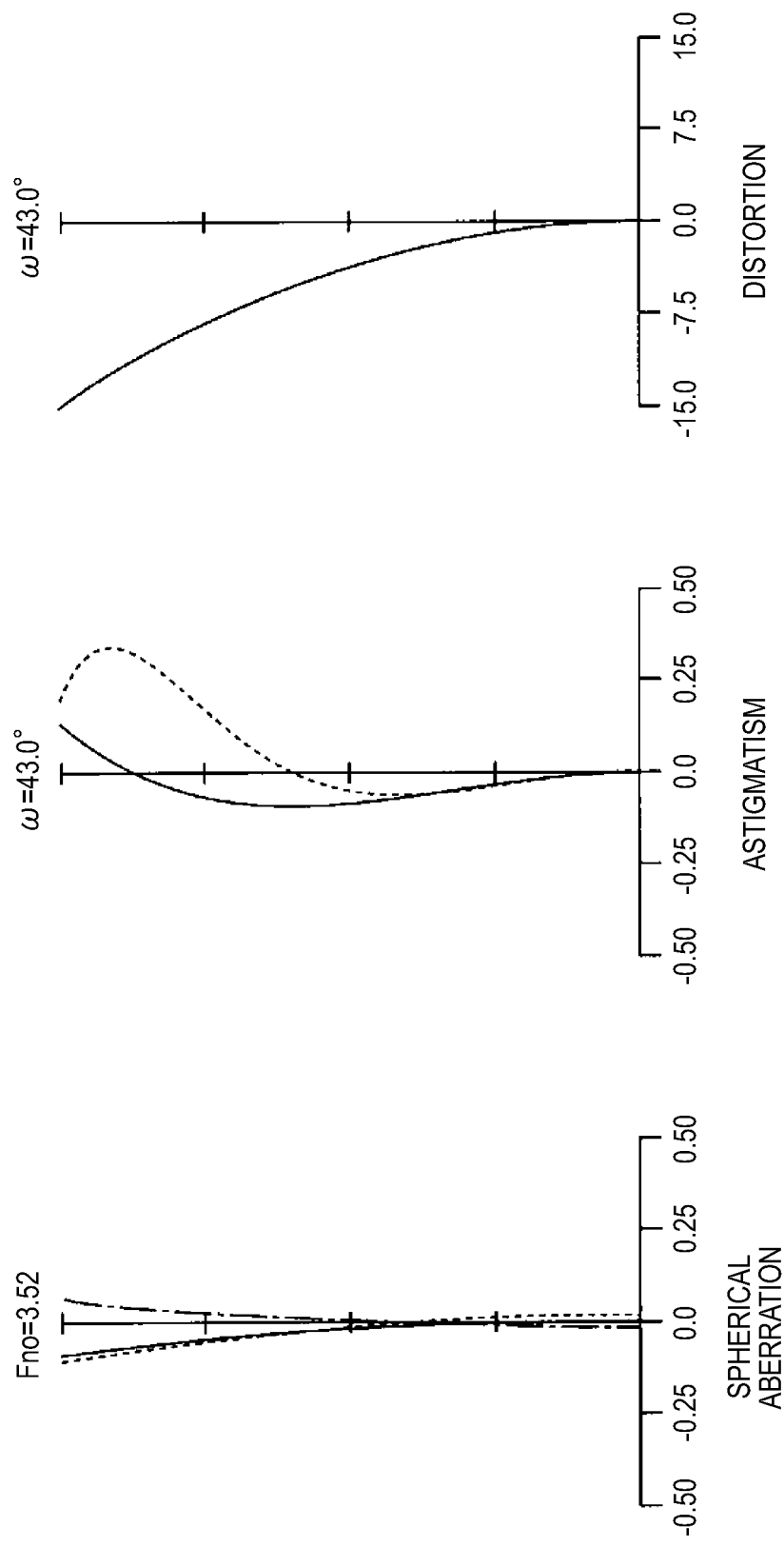
FIG. 2, along with FIGS. 3 and 4, shows aberrations in a numerical example in which specific values are used in Example 1 and shows spherical aberration, astigmatism, and distortion in a wide-angle-end state.
Figure 3:
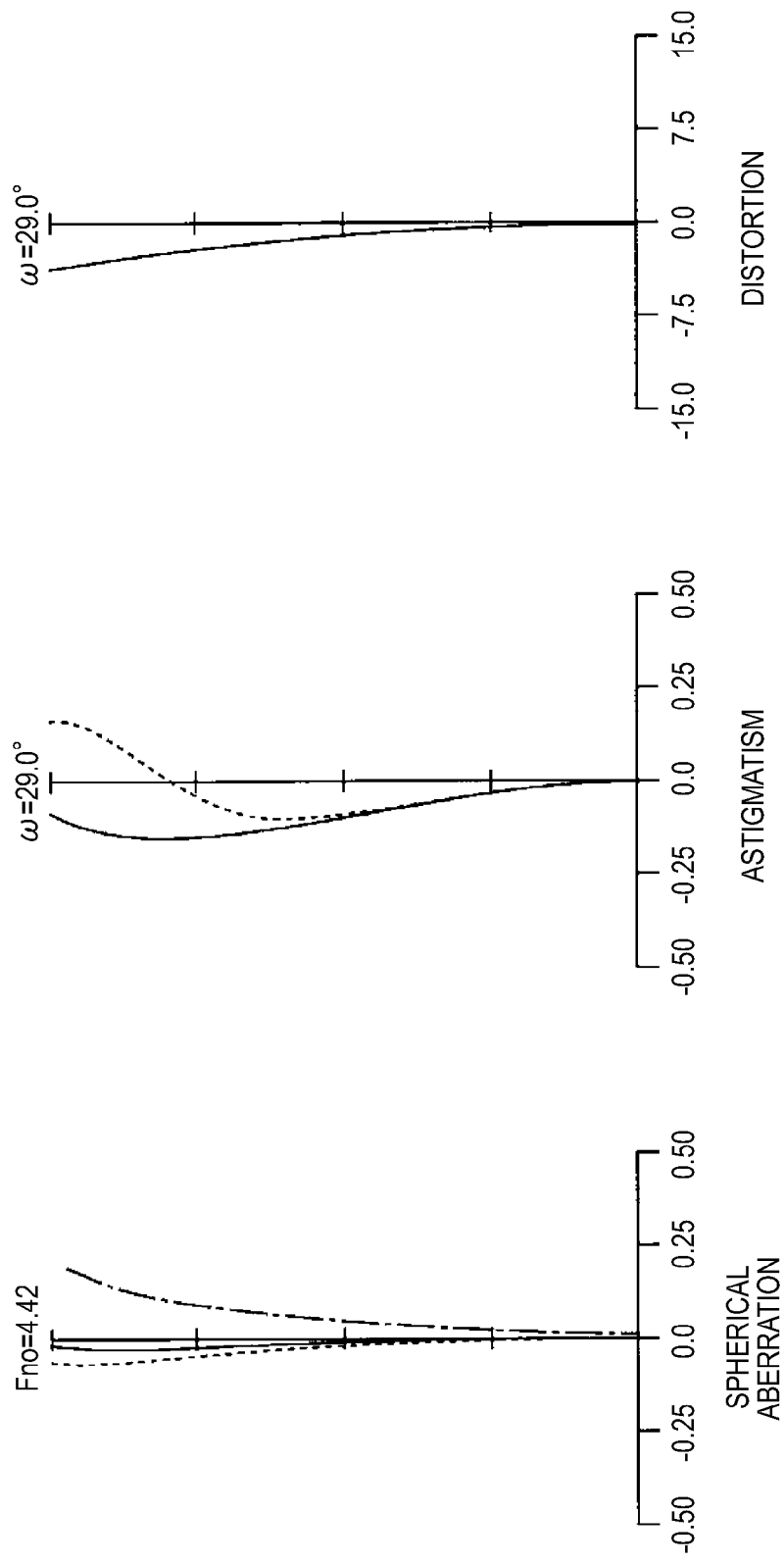
FIG. 3 shows spherical aberration, astigmatism, and distortion in an intermediate-focal-length state.
Figure 4:
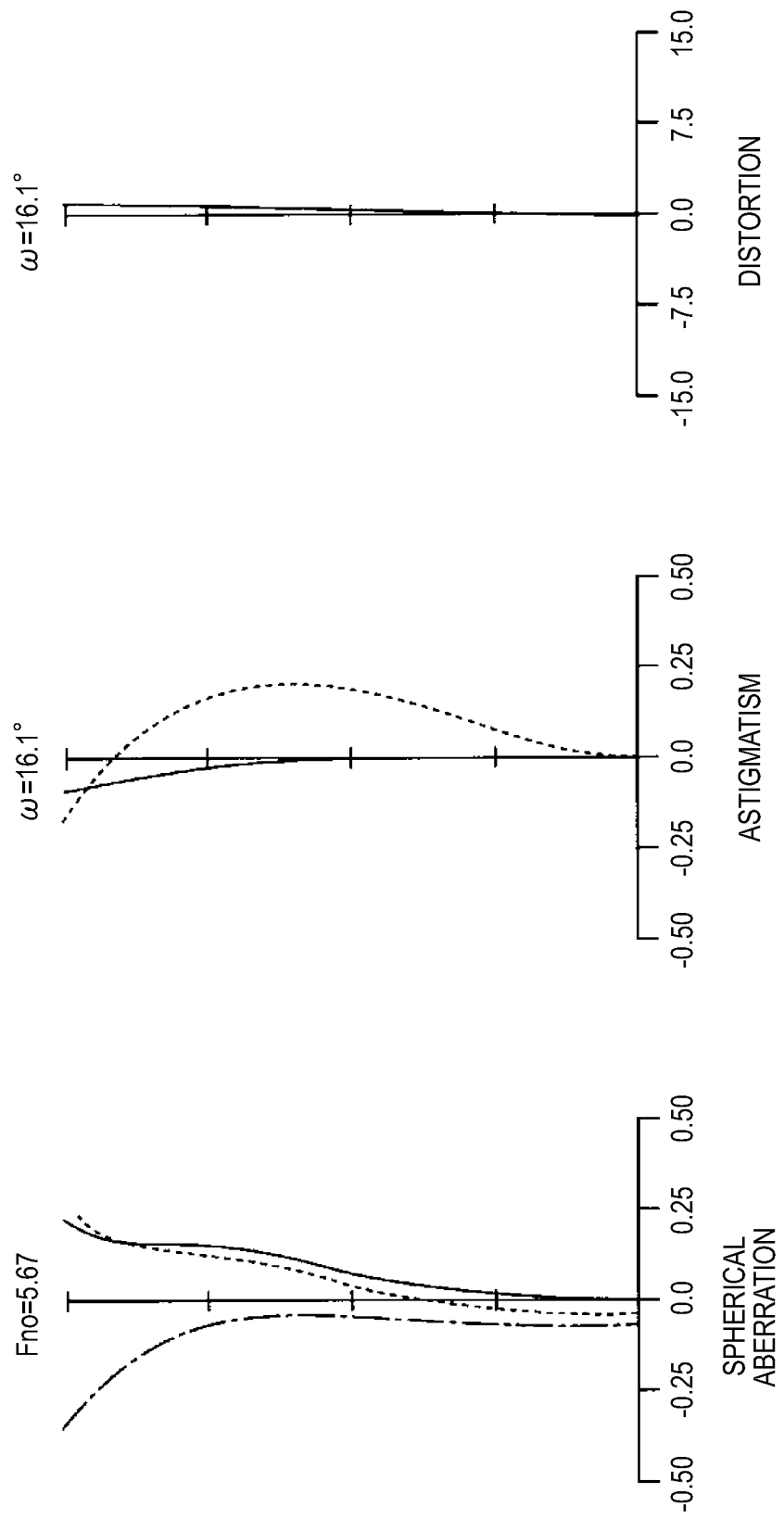
FIG. 4 shows spherical aberration, astigmatism, and distortion in a telescopic-end state.

FIGS. 2 to 4 are aberration diagrams in Numerical Example 1. FIG. 2 shows aberrations in a state in which an infinite point is brought into focus in the wide-angle-end state. FIG. 3 shows the aberrations in the state in which an infinite point is brought into focus in the intermediate-focal-position state. FIG. 4 shows the aberrations in the state in which an infinite point is brought into focus in the telescopic-end state.

In the spherical aberration diagrams in FIGS. 2 to 4, the vertical axis represents the proportion with respect to the full-aperture f-number, and the horizontal axis represents the amount of defocus. The solid lines represent spherical aberration values at the d line (587.56 nm), the dotted lines represent spherical aberration values at the C line (wavelength of 656.3 nm), and the chain lines represent spherical aberration values at the g line (wavelength of 435.8 nm). In the astigmatism diagrams in FIGS. 2 to 4, the vertical axis represents the viewing angle, and the horizontal axis represents the amount of defocus. The solid lines represent astigmatism values in the sagittal image plane at the d line, and the broken lines represent astigmatism values in the meridional image plane at the d line. In the distortion diagrams in FIGS. 2 to 4, the vertical axis represents the viewing angle, and the horizontal axis represents %. The solid lines represent distortion values at the d line.

The aberration diagrams clearly show that the aberrations have been well corrected and excellent imaging performance has been achieved in Numerical Example 1.

Example 2

Figure 5:
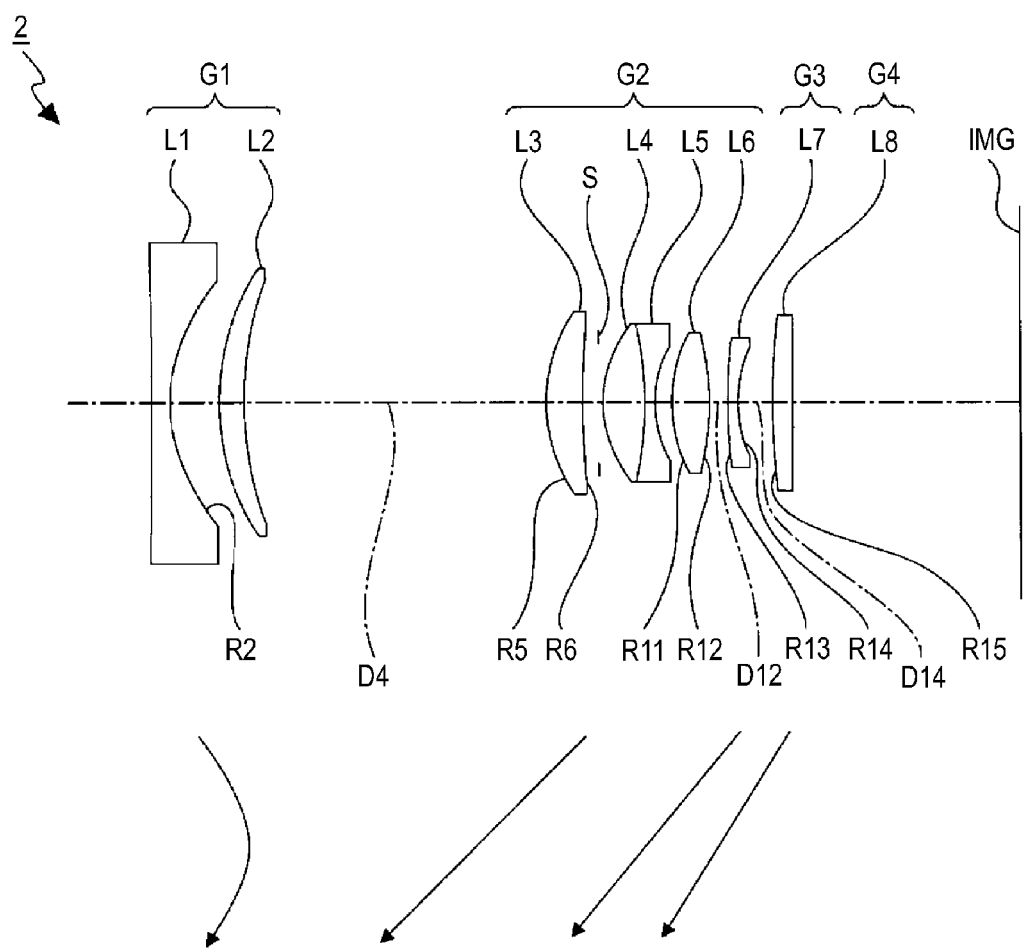
FIG. 5 shows the lens configuration of a zoom lens according to Example 2.

FIG. 5 shows the lens configuration of a zoom lens 2 according to Example 2 of the present technology.

The zoom lens 2 has a zoom magnification ratio set at 3.0.

The first lens group G1 is formed of a biconcave lens L1 and a convex meniscus lens L2, which is a positive lens with a convex surface on the object side, sequentially arranged from the object side toward the image side.

The second lens group G2 is formed of a convex meniscus lens L3 with a convex surface on the object side, a doublet produced by bonding a biconvex lens L4 to a biconcave lens L5, and a biconvex lens L6 sequentially arranged from the object side toward the image side.

The third lens group G3 is formed of a concave meniscus lens L7 with a concave surface on the image side.

The fourth lens group G4 is formed of a convex meniscus lens L8 with a convex surface on the object side.

An aperture stop S is disposed between the convex meniscus lens L3 and the biconvex lens L4 in the second lens group G2.

A low-pass filter (not shown) is disposed between the fourth lens group G4 and the image plane IMG.

Table 4 shows lens data in Numerical Example 2 in which specific values are used in the zoom lens 2 according to Example 2.

TABLE 4

| Si | Ri | Di | Ni | vi |
|---|---|---|---|---|
| 1 | −530.812 | 1.500 | 1.88100 | 40.14 |
| 2 (ASP) | 13.312 | 3.750 | | |
| 3 | 19.154 | 2.064 | 2.00272 | 19.32 |
| 4 | 31.732 | VARIABLE | | |
| 5 (ASP) | 12.823 | 2.823 | 1.59201 | 67.02 |
| 6 (ASP) | 139.378 | 1.200 | | |
| 7 (APERTURE STOP) | INFINITY | 0.300 | | |
| 8 | 9.526 | 3.429 | 1.49700 | 81.61 |
| 9 | −28.022 | 0.700 | 1.83481 | 42.72 |
| 10 | 8.958 | 1.333 | | |
| 11 (ASP) | 10.967 | 2.944 | 1.55332 | 71.68 |
| 12 (ASP) | −19.520 | VARIABLE | | |
| 13 (ASP) | 30.112 | 0.800 | 1.69350 | 53.20 |
| 14 (ASP) | 9.588 | VARIABLE | | |
| 15 (ASP) | 103.613 | 1.500 | 1.82115 | 24.06 |
| 16 | 11462.532 | BF | | |

In the zoom lens 2, the following surfaces are aspheric surfaces: the image-side surface of the concave meniscus lens L1 in the first lens group G1 (second surface); both surfaces of the convex meniscus lens L3 in the second lens group G2 (fifth and sixth surfaces); both surfaces of the biconvex lens L6 in the second lens group G2 (eleventh and twelfth surfaces); both surfaces of the concave meniscus lens L7 in the third lens group G3 (thirteenth and fourteenth surfaces); and the object-side surface of the convex meniscus lens L8 in the fourth lens group G4 (fifteenth surface).

Table 5 shows the fourth, sixth, eighth, and tenth aspheric coefficients A4, A6, A8, A10 and the conic constant κ of the aspheric surfaces in Numerical Example 2.

TABLE 5

| Si | κ | A4 | A6 | A8 | A10 |
|---|---|---|---|---|---|
| 2 | −8.98100E−01 | 3.36674E−05 | −4.49798E−09 | 4.73252E−10 | −1.86737E−12 |
| 5 | 0.00000E+00 | 8.93507E−06 | 8.16036E−07 | −1.80840E−08 | 4.73973E−10 |
| 6 | 0.00000E+00 | 1.30834E−05 | 1.04173E−06 | −1.69999E−08 | 4.52128E−10 |
| 11 | 0.00000E+00 | −1.81236E−04 | 2.25394E−06 | −2.21213E−08 | 2.75285E−09 |
| 12 | 0.00000E+00 | 1.68672E−05 | 3.00885E−06 | −3.90391E−08 | 3.46239E−09 |
| 13 | 0.00000E+00 | −4.80339E−04 | 1.48179E−05 | −2.16127E−07 | −4.07265E−10 |
| 14 | 0.00000E+00 | −4.97887E−04 | 1.55098E−05 | −3.85762E−07 | 3.09277E−09 |
| 15 | 0.00000E+00 | 3.66421E−05 | 4.50360E−07 | −1.14419E−08 | 1.06259E−10 |

When the magnification of the zoom lens 2 is changed between the wide-angle-end state and the telescopic-end state, the following inter-surface distances change: the inter-surface distance D4 between the first lens group G1 and the second lens group G2; the inter-surface distance D12 between the second lens group G2 and the third lens group G3; and the inter-surface distance D14 between the third lens group G3 and the fourth lens group G4.

Table 6 shows the variable inter-surface distances in the wide-angle-end state, the intermediate-focal-position state, and the telescopic-end state along with the f-number Fno and the half viewing angle ω in Numerical Example 2.

TABLE 6

|  | Wide angle end | Intermediate focal position | Telescopic end |
|---|---|---|---|
| Fno | 3.52 | 4.42 | 5.67 |
| f | 16.36 | 26.00 | 48.55 |
| ω [°] | 42.64 | 28.88 | 16.28 |
| D4 | 23.622 | 10.924 | 1.500 |
| D12 | 1.500 | 2.873 | 4.306 |
| D14 | 2.699 | 5.047 | 6.838 |

Figure 6:
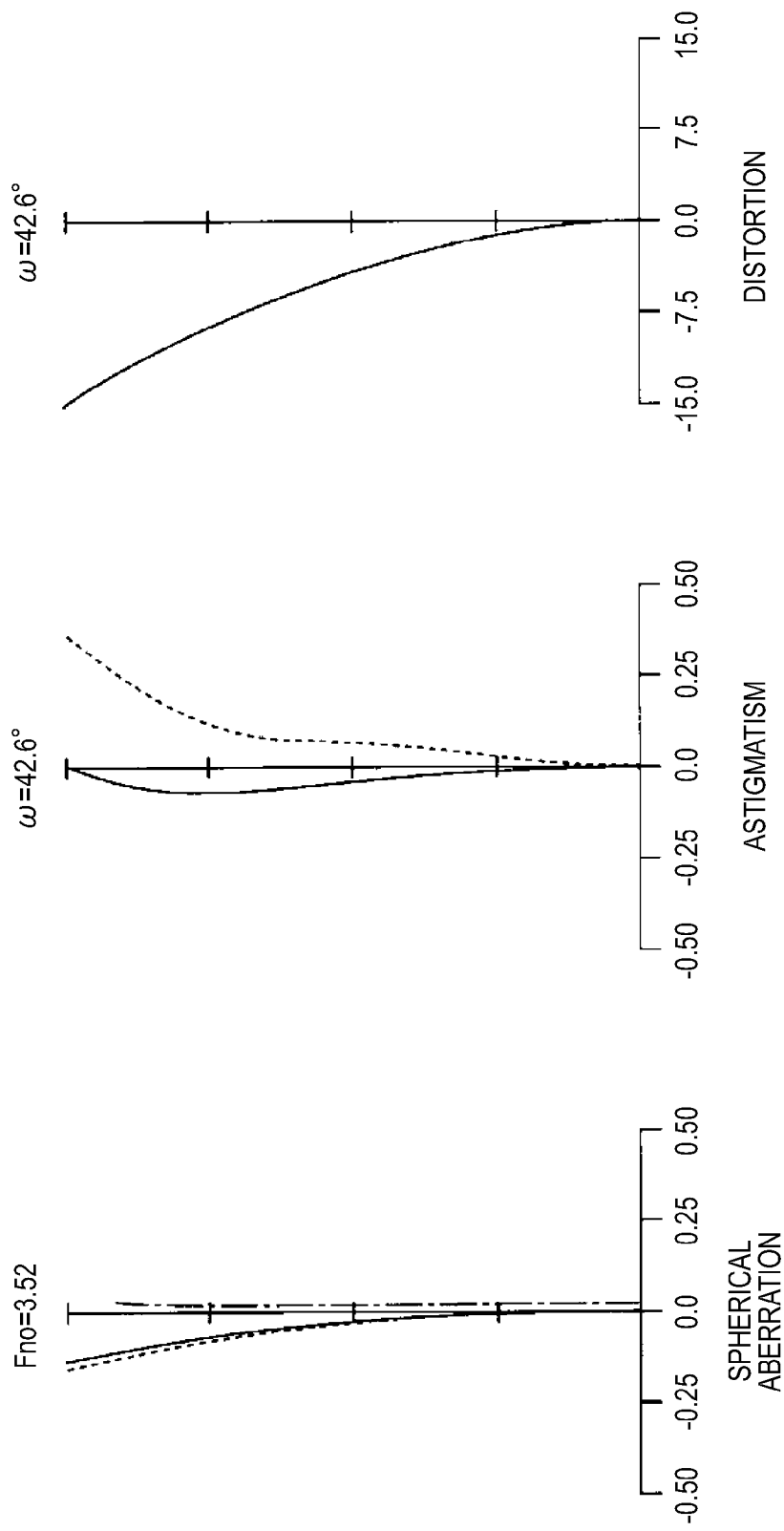
FIG. 6, along with FIGS. 7 and 8, shows aberrations in a numerical example in which specific values are used in Example 2 and shows spherical aberration, astigmatism, and distortion in the wide-angle-end state.
Figure 7:
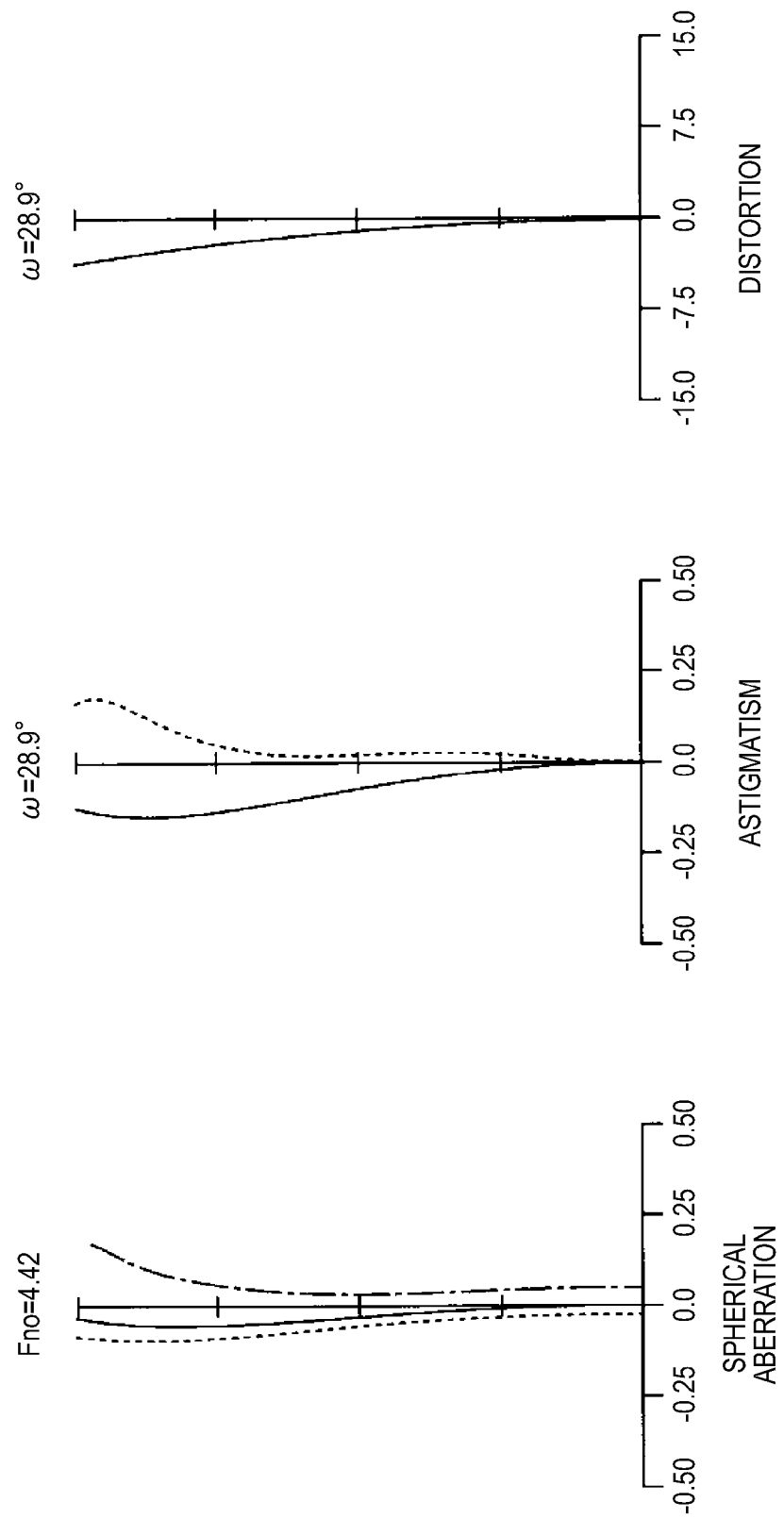
FIG. 7 shows spherical aberration, astigmatism, and distortion in the intermediate-focal-length state.
Figure 8:
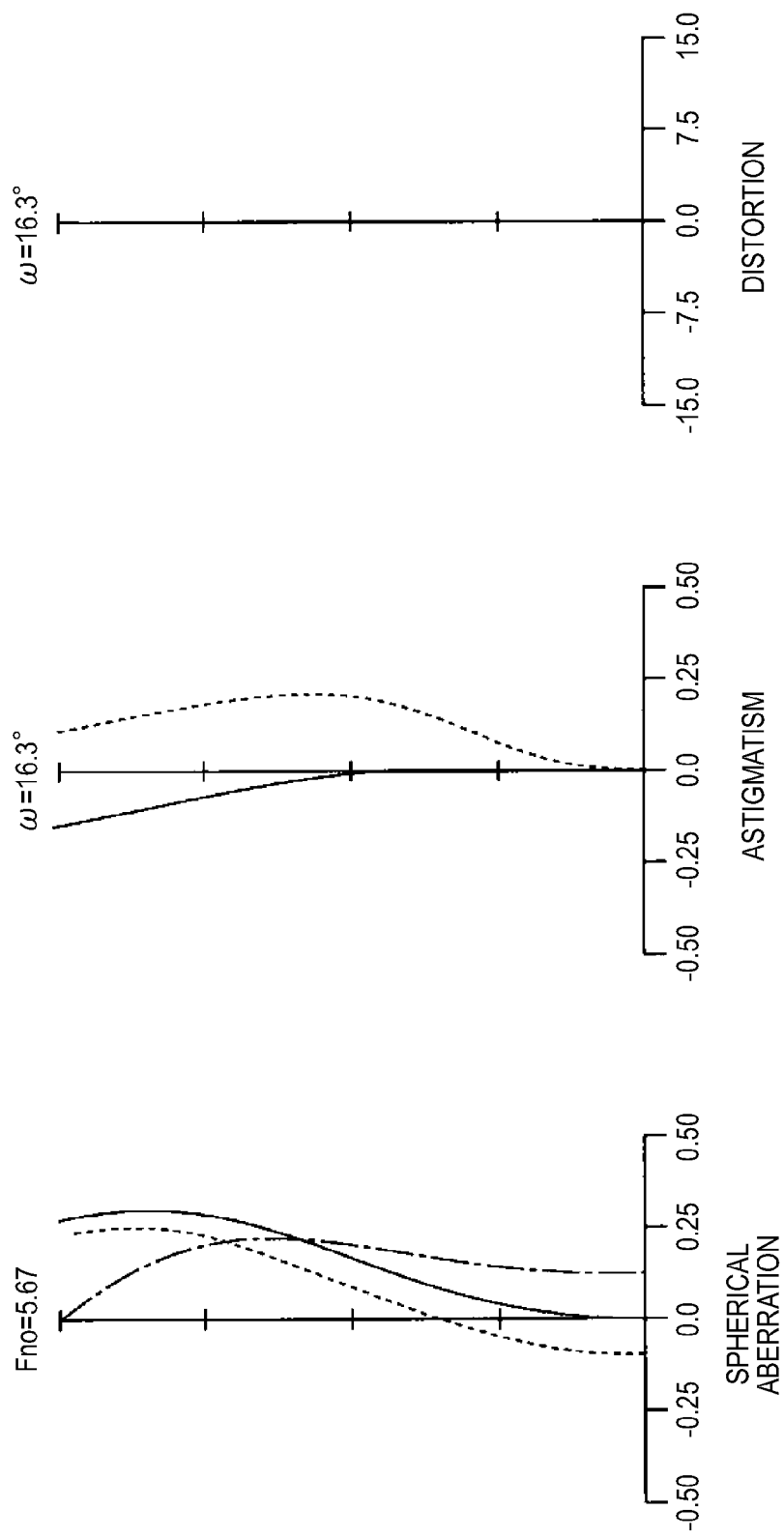
FIG. 8 shows spherical aberration, astigmatism, and distortion in the telescopic-end state.

FIGS. 6 to 8 are aberration diagrams in Numerical Example 2. FIG. 6 shows aberrations in the state in which an infinite point is brought into focus in the wide-angle-end state. FIG. 7 shows the aberrations in the state in which an infinite point is brought into focus in the intermediate-focal-position state. FIG. 8 shows the aberrations in the state in which an infinite point is brought into focus in the telescopic-end state.

In the spherical aberration diagrams in FIGS. 6 to 8, the vertical axis represents the proportion with respect to the full-aperture f-number, and the horizontal axis represents the amount of defocus. The solid lines represent spherical aberration values at the d line (587.56 nm), the dotted lines represent spherical aberration values at the C line (wavelength of 656.3 nm), and the chain lines represent spherical aberration values at the g line (wavelength of 435.8 nm). In the astigmatism diagrams in FIGS. 6 to 8, the vertical axis represents the viewing angle, and the horizontal axis represents the amount of defocus. The solid lines represent astigmatism values in the sagittal image plane at the d line, and the broken lines represent astigmatism values in the meridional image plane at the d line. In the distortion diagrams in FIGS. 6 to 8, the vertical axis represents the viewing angle, and the horizontal axis represents %. The solid lines represent distortion values at the d line.

The aberration diagrams clearly show that the aberrations have been well corrected and excellent imaging performance has been achieved in Numerical Example 2.

Example 3

Figure 9:
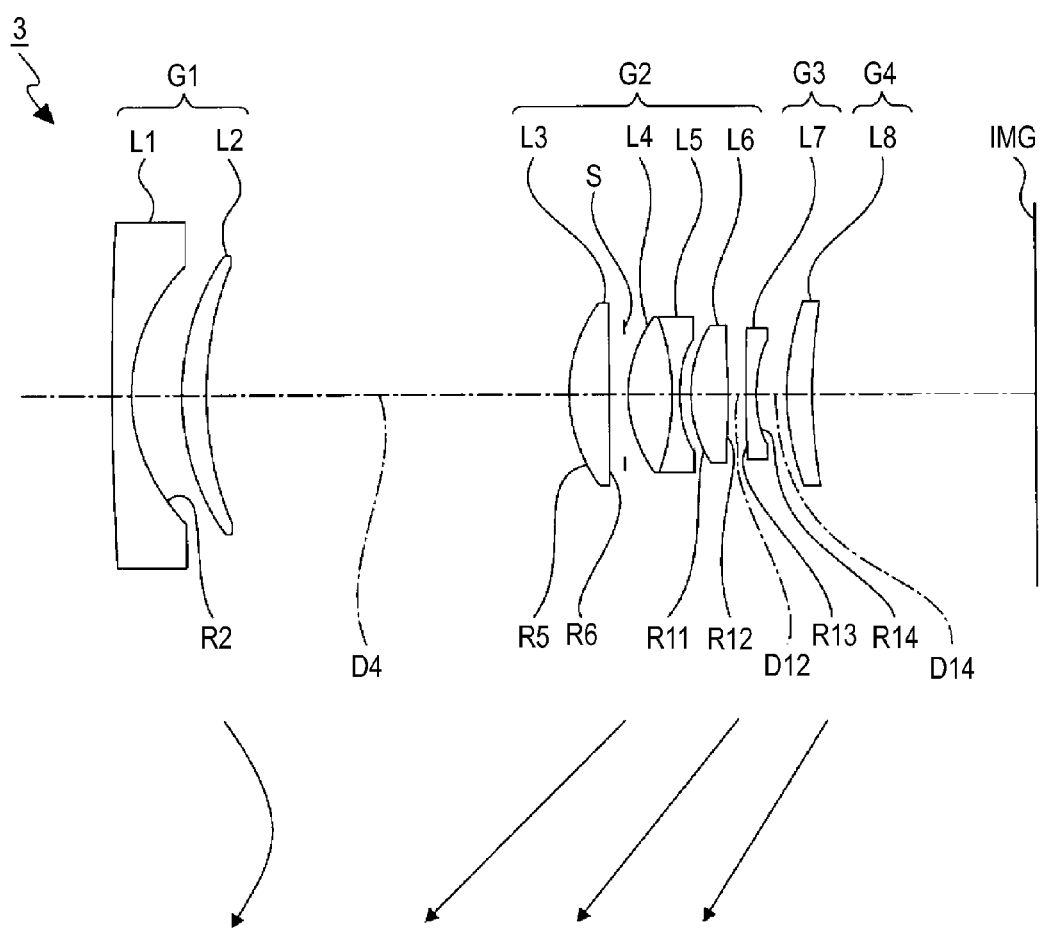
FIG. 9 shows the lens configuration of a zoom lens according to Example 3.

FIG. 9 shows the lens configuration of a zoom lens 3 according to Example 3 of the present technology.

The zoom lens 3 has a zoom magnification ratio set at 3.0.

The first lens group G1 is formed of a concave meniscus lens L1, which is a negative lens with a concave surface on the image side, and a convex meniscus lens L2, which is a positive lens with a convex surface on the object side, sequentially arranged from the object side toward the image side.

The second lens group G2 is formed of a biconvex lens L3, a doublet produced by bonding a biconvex lens L4 to a biconcave lens L5, and a biconvex lens L6 sequentially arranged from the object side toward the image side.

The third lens group G3 is formed of a concave meniscus lens L7 with a concave surface on the image side.

The fourth lens group G4 is formed of a convex meniscus lens L8 with a convex surface on the object side.

An aperture stop S is disposed between the biconvex lens L3 and the biconvex lens L4 in the second lens group G2.

A low-pass filter (not shown) is disposed between the fourth lens group G4 and the image plane IMG.

Table 7 shows lens data in Numerical Example 3 in which specific values are used in the zoom lens 3 according to Example 3.

TABLE 7

| Si | Ri | Di | Ni | vi |
|---|---|---|---|---|
| 1 | 251.548 | 1.500 | 1.83481 | 42.72 |
| 2 (ASP) | 13.133 | 4.144 |  |  |
| 3 | 19.074 | 2.000 | 2.00272 | 19.32 |
| 4 | 28.000 | VARIABLE |  |  |
| 5 (ASP) | 12.892 | 3.179 | 1.59201 | 67.02 |
| 6 (ASP) | −957.351 | 1.200 |  |  |
| 7 (APERTURE STOP) | INFINITY | 0.300 |  |  |
| 8 | 10.338 | 3.399 | 1.49700 | 81.61 |
| 9 | −21.217 | 0.700 | 1.83481 | 42.72 |
| 10 | 9.596 | 1.000 |  |  |
| 11 (ASP) | 11.350 | 2.893 | 1.59201 | 67.02 |
| 12 (ASP) | −29.241 | VARIABLE |  |  |
| 13 (ASP) | 94.059 | 0.800 | 1.82080 | 42.71 |
| 14 (ASP) | 11.307 | VARIABLE |  |  |
| 15 | 21.122 | 2.000 | 1.84666 | 23.78 |
| 16 | 39.798 | BF |  |  |

In the zoom lens 3, the following surfaces are aspheric surfaces: the image-side surface of the concave meniscus lens L1 in the first lens group G1 (second surface); both surfaces of the biconvex lens L3 in the second lens group G2 (fifth and sixth surfaces); both surfaces of the biconvex lens L6 in the second lens group G2 (eleventh and twelfth surfaces); and both surfaces of the concave meniscus lens L7 in the third lens group G3 (thirteenth and fourteenth surfaces).

Table 8 shows the fourth, sixth, eighth, and tenth aspheric coefficients A4, A6, A8, A10 and the conic constant κ of the aspheric surfaces in Numerical Example 3.

TABLE 8

| Si | κ | A4 | A6 | A8 | A10 |
|---|---|---|---|---|---|
| 2 | −8.99255E−01 | 3.58297E−05 | 6.95706E−08 | 3.52391E−10 | −1.22421E−12 |
| 5 | 0.00000E+00 | 3.61878E−06 | 4.42306E−07 | −5.04665E−09 | 1.62543E−10 |
| 6 | 0.00000E+00 | 3.39302E−06 | 4.85352E−07 | −1.08617E−10 | 4.91059E−11 |
| 11 | 0.00000E+00 | −5.43534E−05 | 6.27748E−06 | −1.07020E−07 | 6.45676E−09 |
| 12 | 0.00000E+00 | 8.08175E−05 | 9.53634E−06 | −2.56744E−07 | 1.16497E−08 |
| 13 | 0.00000E+00 | −3.56752E−04 | 1.64689E−05 | −4.12927E−07 | 3.28491E−09 |
| 14 | 0.00000E+00 | −3.52095E−04 | 1.47477E−05 | −3.85762E−07 | 3.09277E−09 |

When the magnification of the zoom lens 3 is changed between the wide-angle-end state and the telescopic-end state, the following inter-surface distances change: the inter-surface distance D4 between the first lens group G1 and the second lens group G2; the inter-surface distance D12 between the second lens group G2 and the third lens group G3; and the inter-surface distance D14 between the third lens group G3 and the fourth lens group G4.

Table 9 shows the variable inter-surface distances in the wide-angle-end state, the intermediate-focal-position state, and the telescopic-end state along with the f-number Fno and the half viewing angle ω in Numerical Example 3.

TABLE 9

| | Wide angle end | Intermediate focal position | Telescopic end |
|---|---|---|---|
| Fno | 3.60 | 4.50 | 5.74 |
| f | 16.32 | 26.00 | 48.50 |
| ω [°] | 42.95 | 28.73 | 15.88 |
| D4 | 29.008 | 14.867 | 1.500 |
| D12 | 1.500 | 2.500 | 6.354 |
| D14 | 2.377 | 3.250 | 4.229 |

Figure 10:
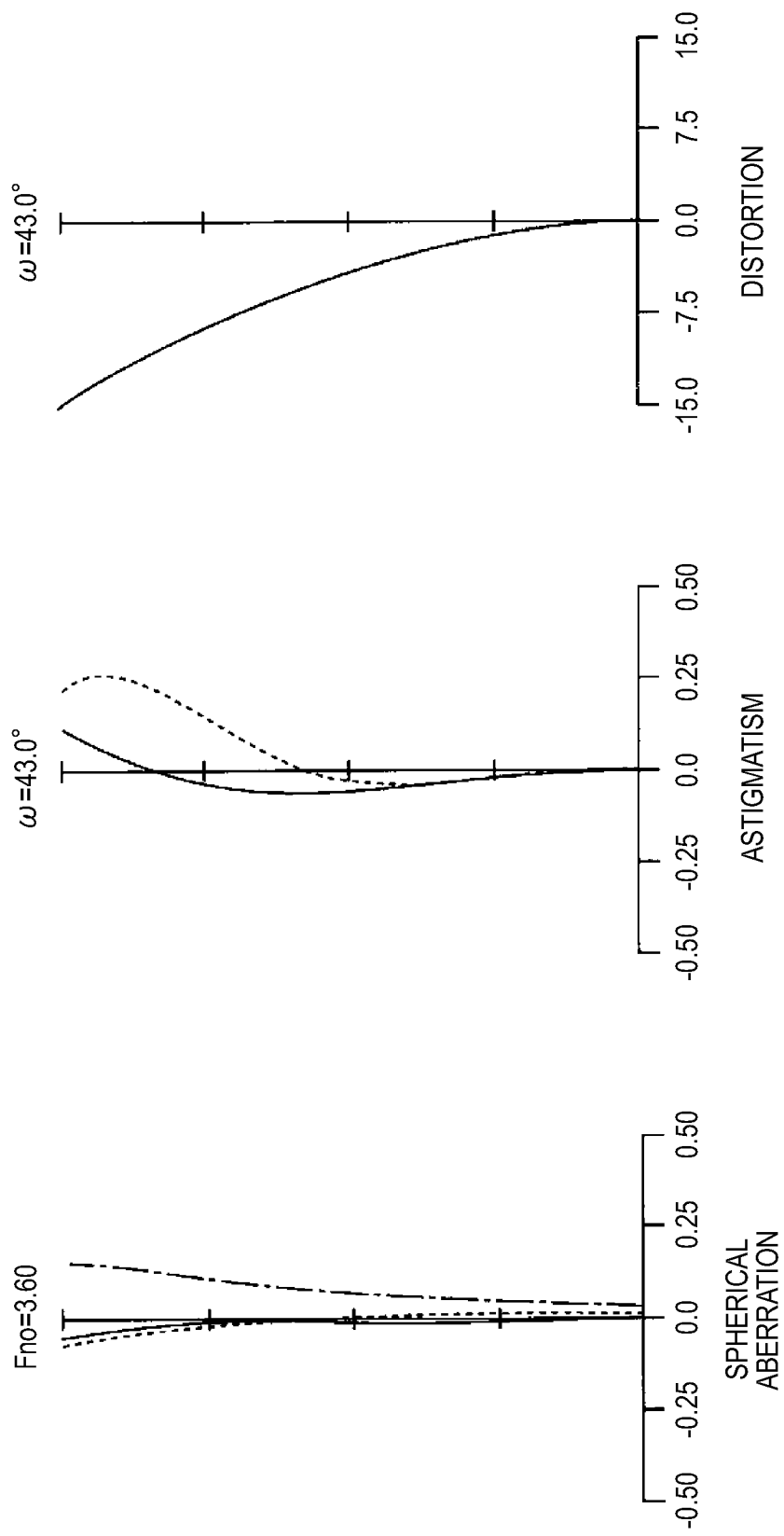
FIG. 10, along with FIGS. 11 and 12, shows aberrations in a numerical example in which specific values are used in Example 3 and shows spherical aberration, astigmatism, and distortion in the wide-angle-end state.
Figure 11:
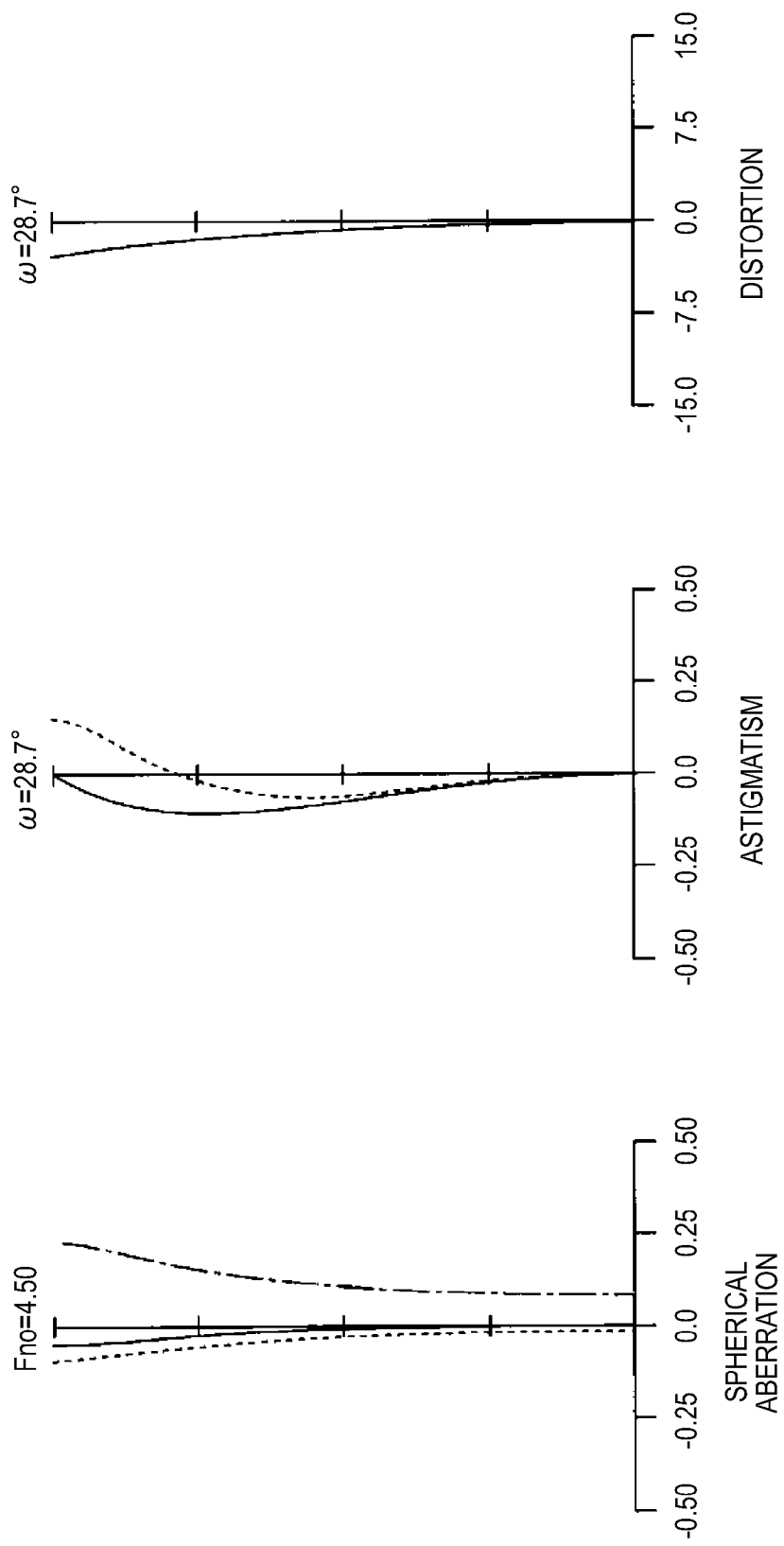
FIG. 11 shows spherical aberration, astigmatism, and distortion in the intermediate-focal-length state.
Figure 12:
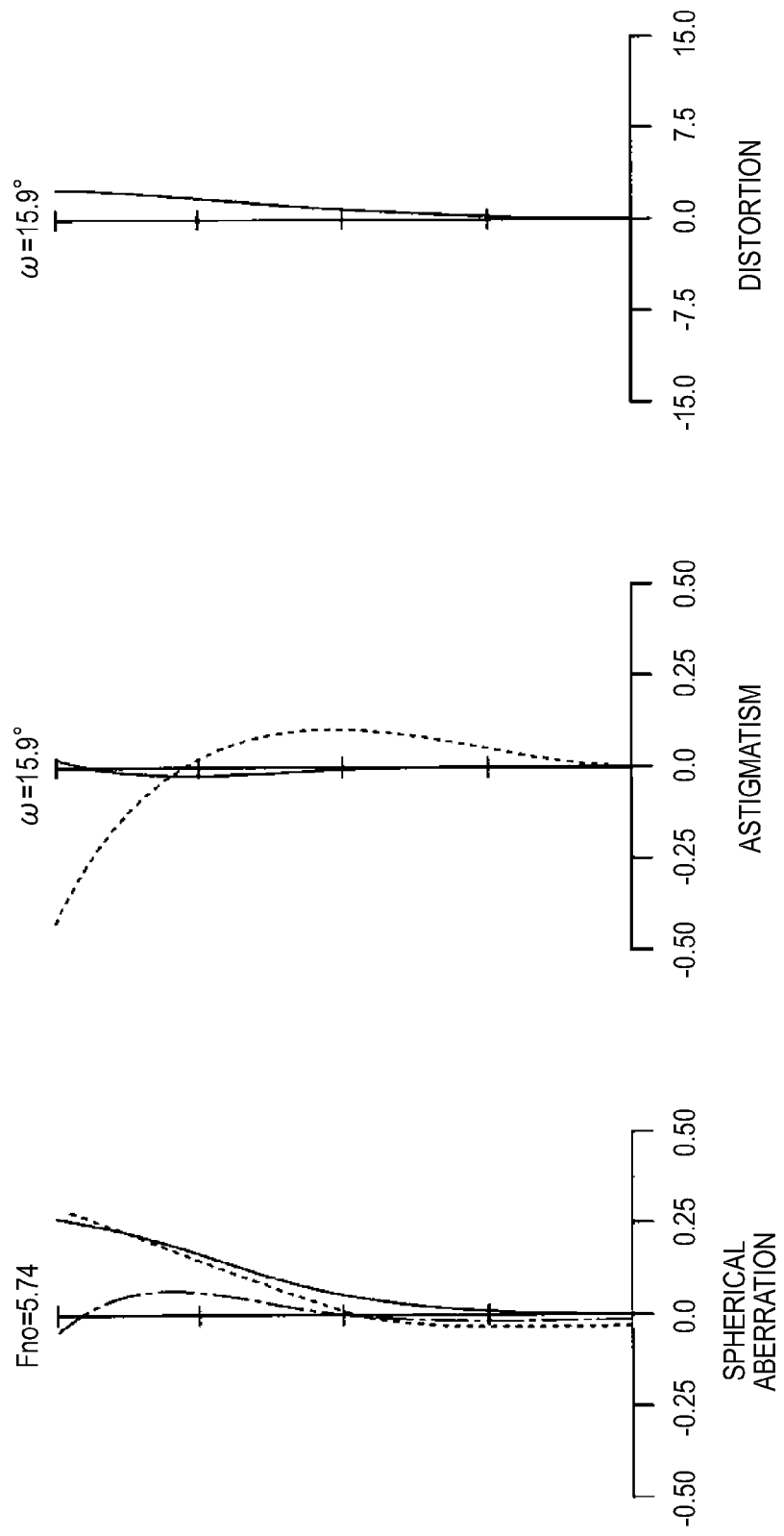
FIG. 12 shows spherical aberration, astigmatism, and distortion in the telescopic-end state.

FIGS. 10 to 12 are aberration diagrams in Numerical Example 3. FIG. 10 shows aberrations in the state in which an infinite point is brought into focus in the wide-angle-end state. FIG. 11 shows the aberrations in the state in which an infinite point is brought into focus in the intermediate-focal-position state. FIG. 12 shows the aberrations in the state in which an infinite point is brought into focus in the telescopic-end state.

In the spherical aberration diagrams in FIGS. 10 to 12, the vertical axis represents the proportion with respect to the full-aperture f-number, and the horizontal axis represents the amount of defocus. The solid lines represent spherical aberration values at the d line (587.56 nm), the dotted lines represent spherical aberration values at the C line (wavelength of 656.3 nm), and the chain lines represent spherical aberration values at the g line (wavelength of 435.8 nm). In the astigmatism diagrams in FIGS. 6 to 8, the vertical axis represents the viewing angle, and the horizontal axis represents the amount of defocus. The solid lines represent astigmatism values in the sagittal image plane at the d line, and the broken lines represent astigmatism values in the meridional image plane at the d line. In the distortion diagrams in FIGS. 6 to 8, the vertical axis represents the viewing angle, and the horizontal axis represents %. The solid lines represent distortion values at the d line.

The aberration diagrams clearly show that the aberrations have been well corrected and excellent imaging performance has been achieved in Numerical Example 3.

Example 4

Figure 13:
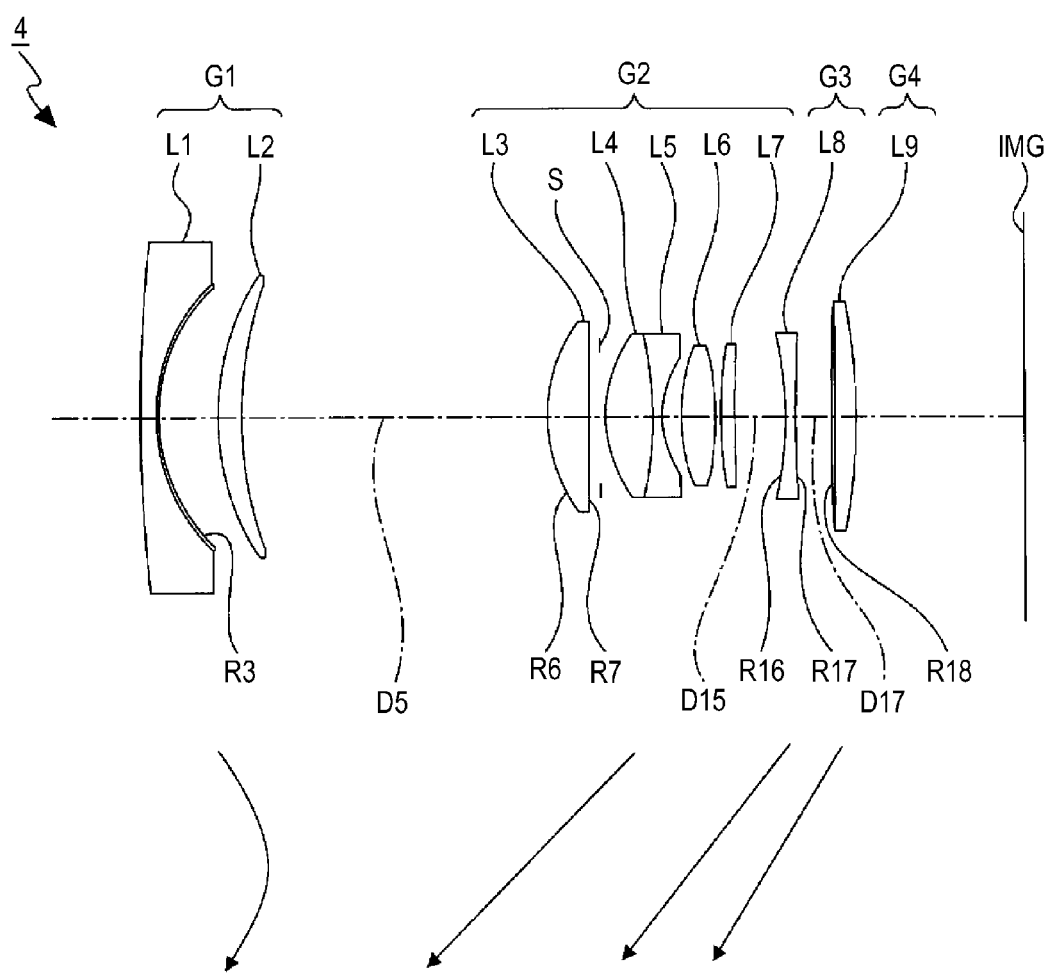
FIG. 13 shows the lens configuration of a zoom lens according to Example 4.

FIG. 13 shows the lens configuration of a zoom lens 4 according to Example 4 of the present technology.

The zoom lens 4 has a zoom magnification ratio set at 2.9.

The first lens group G1 is formed of a concave meniscus lens L1, which is a negative lens with a concave surface on the image side, and a convex meniscus lens L2, which is a positive lens with a convex surface on the object side, sequentially arranged from the object side toward the image side. The image-side surface of the concave meniscus lens L1 is a complex aspheric surface.

The second lens group G2 is formed of a biconvex lens L3, a doublet produced by bonding a biconvex lens L4 to a biconcave lens L5, a biconvex lens L6, and a convex meniscus lens L7 with a convex surface on the object side sequentially arranged from the object side toward the image side.

The third lens group G3 is formed of a biconcave lens L8.

The fourth lens group G4 is formed of a biconvex lens L9. The object-side surface of the biconvex lens L9 is a complex aspheric surface.

An aperture stop S is disposed between the biconvex lens L3 and the biconvex lens L4 in the second lens group G2.

A low-pass filter (not shown) is disposed between the fourth lens group G4 and the image plane IMG.

Table 10 shows lens data in Numerical Example 4 in which specific values are used in the zoom lens 4 according to Example 4.

TABLE 10

| Si | Ri | Di | Ni | vi |
|---|---|---|---|---|
| 1 | 112.531 | 1.200 | 1.88100 | 40.14 |
| 2 | 13.181 | 0.150 | 1.53420 | 41.73 |
| 3 (ASP) | 12.128 | 4.672 | | |
| 4 | 18.837 | 1.798 | 2.00272 | 19.32 |
| 5 | 28.000 | VARIABLE | | |
| 6 (ASP) | 12.028 | 3.017 | 1.59201 | 67.02 |
| 7 (ASP) | −2615.434 | 1.000 | | |
| 8 (APERTURE STOP) | INFINITY | 0.300 | | |
| 9 | 9.715 | 3.818 | 1.49700 | 81.61 |
| 10 | −23.551 | 0.700 | 1.83481 | 42.72 |
| 11 | 8.082 | 1.459 | | |
| 12 | 15.626 | 2.500 | 1.48749 | 70.45 |
| 13 | −25.435 | 0.500 | | |
| 14 | 29.897 | 1.142 | 1.48749 | 70.45 |
| 15 | 253.090 | VARIABLE | | |
| 16 (ASP) | −24.028 | 0.800 | 1.76802 | 49.24 |
| 17 (ASP) | 56.900 | VARIABLE | | |
| 18 (ASP) | 563.460 | 0.150 | 1.53420 | 41.73 |
| 19 | 311.523 | 1.700 | 1.83400 | 37.34 |
| 20 | −48.085 | BF | | |

In the zoom lens 4, the following surfaces are aspheric surfaces: the image-side surface of the concave meniscus lens L1 in the first lens group G1 (third surface); both surfaces of the biconvex lens L3 in the second lens group G2 (sixth and seventh surfaces); both surfaces of the biconcave lens L8 in the third lens group G3 (sixteenth and seventeenth surfaces); and the object-side surface of the biconvex lens L9 in the fourth lens group G4 (eighteenth surface).

Table 11 shows the fourth, sixth, eighth, and tenth aspheric coefficients A4, A6, A8, A10 and the conic constant κ of the aspheric surfaces in Numerical Example 4.

TABLE 11

| Si | κ | A4 | A6 | A8 | A10 |
|---|---|---|---|---|---|
| 3 | −5.68546E−02 | −1.90925E−05 | −3.67341E−07 | 2.21700E−09 | −2.45637E−11 |
| 6 | 0.00000E+00 | −3.84963E−06 | −2.05025E−07 | 4.04368E−09 | −1.14032E−10 |
| 7 | 0.00000E+00 | 1.39413E−05 | −9.38047E−08 | −1.17526E−09 | −6.38308E−11 |
| 16 | 0.00000E+00 | −2.25879E−04 | 2.11221E−05 | −6.03816E−07 | 6.85603E−09 |
| 17 | 0.00000E+00 | −1.52110E−04 | 1.71789E−05 | −4.68628E−07 | 4.78057E−09 |
| 18 | −2.00000E+00 | 4.21186E−06 | 3.59219E−07 | −4.49480E−09 | 2.02715E−11 |

When the magnification of the zoom lens 4 is changed between the wide-angle-end state and the telescopic-end state, the following inter-surface distances change: the inter-surface distance D5 between the first lens group G1 and the second lens group G2; the inter-surface distance D15 between the second lens group G2 and the third lens group G3; and the inter-surface distance D17 between the third lens group G3 and the fourth lens group G4.

Table 12 shows the variable inter-surface distances in the wide-angle-end state, the intermediate-focal-position state, and the telescopic-end state along with the f-number Fno and the half viewing angle ω in Numerical Example 4.

TABLE 12

|  | Wide angle end | Intermediate focal position | Telescopic end |
|---|---|---|---|
| Fno | 3.61 | 4.76 | 5.77 |
| f | 16.49 | 28.20 | 48.51 |
| ω [°] | 42.25 | 26.87 | 16.15 |
| D5 | 23.786 | 10.034 | 0.800 |
| D15 | 3.781 | 5.381 | 9.053 |
| D17 | 2.827 | 5.203 | 6.405 |

Figure 14:
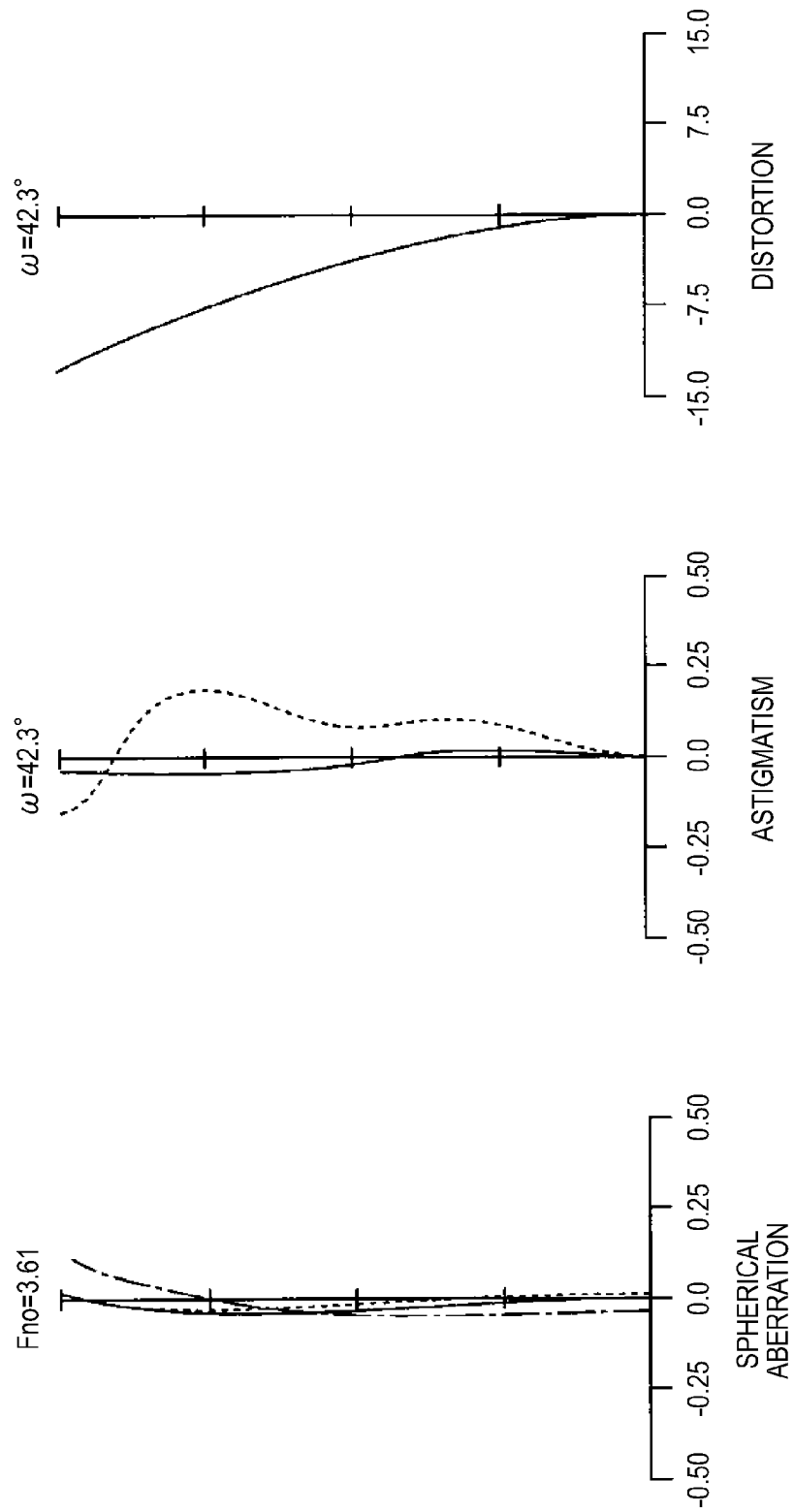
FIG. 14, along with FIGS. 15 and 16, shows aberrations in a numerical example in which specific values are used in Example 4 and shows spherical aberration, astigmatism, and distortion in the wide-angle-end state.
Figure 15:
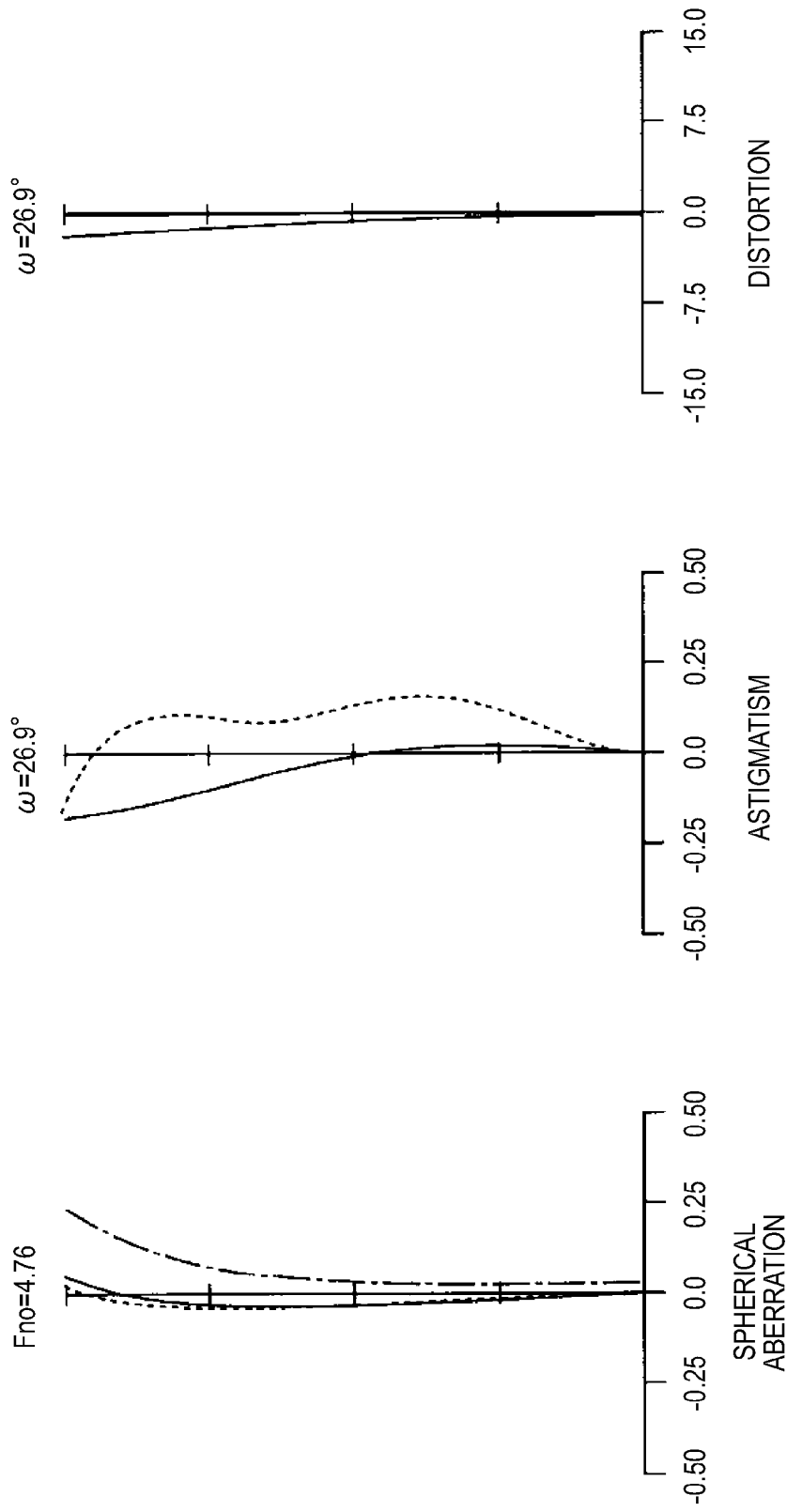
FIG. 15 shows spherical aberration, astigmatism, and distortion in the intermediate-focal-length state.
Figure 16:
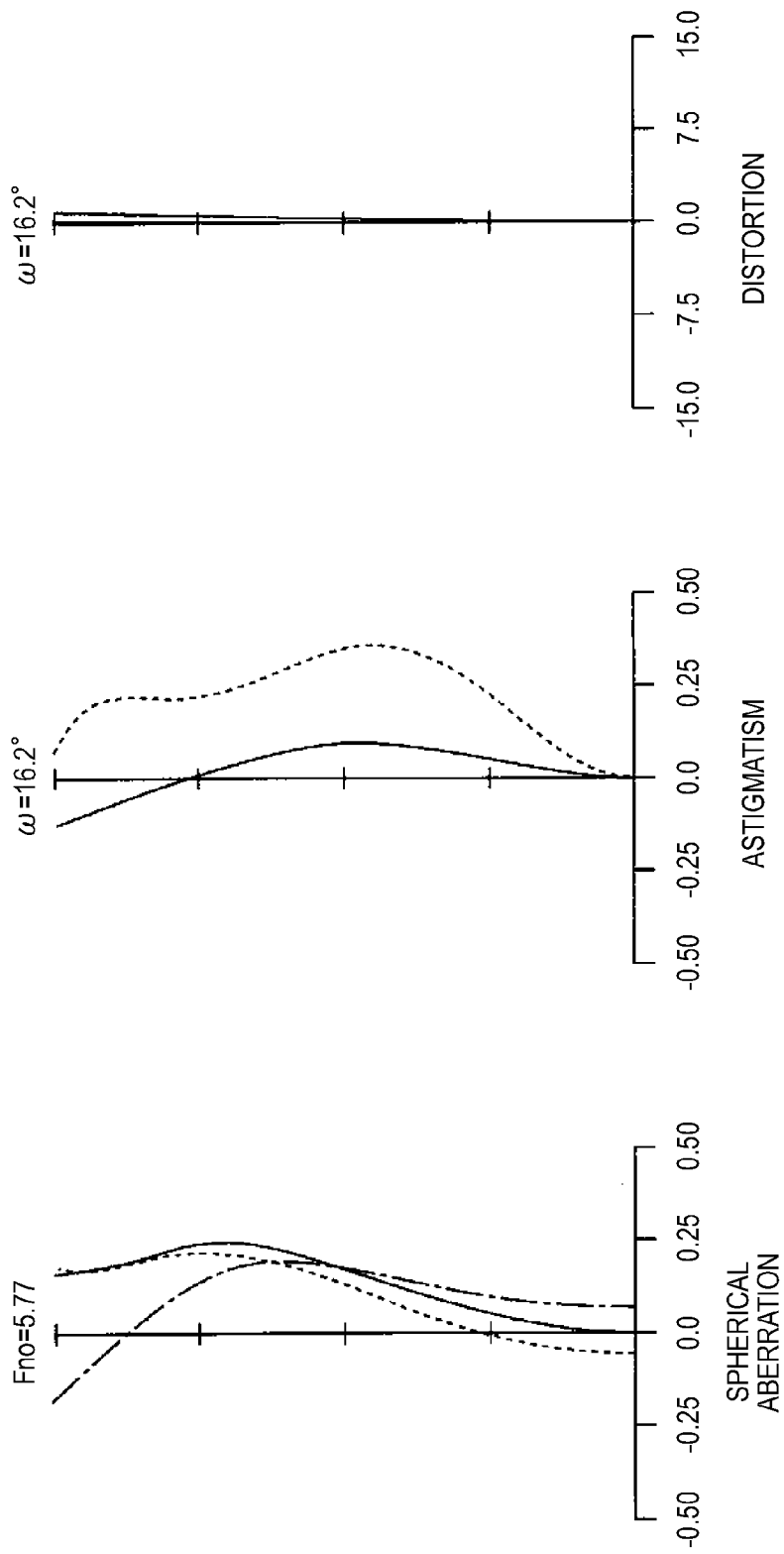
FIG. 16 shows spherical aberration, astigmatism, and distortion in the telescopic-end state.

FIGS. 14 to 16 are aberration diagrams in Numerical Example 4. FIG. 14 shows aberrations in the state in which an infinite point is brought into focus in the wide-angle-end state. FIG. 15 shows the aberrations in the state in which an infinite point is brought into focus in the intermediate-focal-position state. FIG. 16 shows the aberrations in the state in which an infinite point is brought into focus in the telescopic-end state.

In the spherical aberration diagrams in FIGS. 14 to 16, the vertical axis represents the proportion with respect to the full-aperture f-number, and the horizontal axis represents the amount of defocus. The solid lines represent spherical aberration values at the d line (587.56 nm), the dotted lines represent spherical aberration values at the C line (wavelength of 656.3 nm), and the chain lines represent spherical aberration values at the g line (wavelength of 435.8 nm). In the astigmatism diagrams in FIGS. 6 to 8, the vertical axis represents the viewing angle, and the horizontal axis represents the amount of defocus. The solid lines represent astigmatism values in the sagittal image plane at the d line, and the broken lines represent astigmatism values in the meridional image plane at the d line. In the distortion diagrams in FIGS. 6 to 8, the vertical axis represents the viewing angle, and the horizontal axis represents %. The solid lines represent distortion values at the d line.

The aberration diagrams clearly show that the aberrations have been well corrected and excellent imaging performance has been achieved in Numerical Example 4.

Fifth Example

Figure 17:
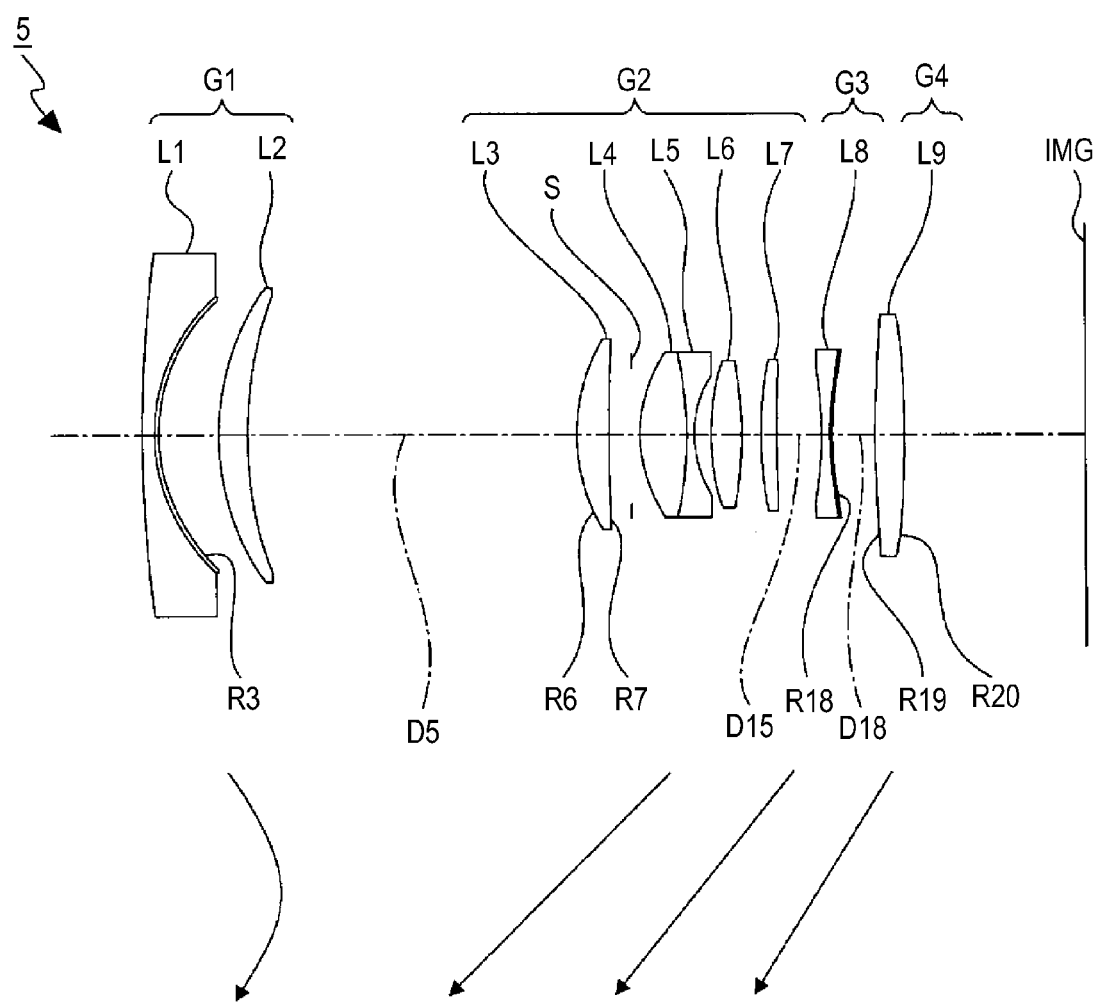
FIG. 17 shows the lens configuration of a zoom lens according to Example 5.

FIG. 17 shows the lens configuration of a zoom lens 5 according to Example 5 of the present technology.

The zoom lens 5 has a zoom magnification ratio set at 2.9.

The first lens group G1 is formed of a concave meniscus lens L1, which is a negative lens with a concave surface on the image side, and a convex meniscus lens L2, which is a positive lens with a convex surface on the object side, sequentially arranged from the object side toward the image side. The image-side surface of the concave meniscus lens L1 is a complex aspheric surface.

The second lens group G2 is formed of a convex meniscus lens L3 with a convex surface on the object side, a doublet produced by bonding a biconvex lens L4 to a biconcave lens L5, a biconvex lens L6, and a convex meniscus lens L7 with a convex surface on the object side sequentially arranged from the object side toward the image side.

The third lens group G3 is formed of a biconcave lens L8. The image-side surface of the biconcave lens L8 is a complex aspheric surface.

The fourth lens group G4 is formed of a biconvex lens L9.

An aperture stop S is disposed between the convex meniscus lens L3 and the biconvex lens L4 in the second lens group G2.

A low-pass filter (not shown) is disposed between the fourth lens group G4 and the image plane IMG.

Table 13 shows lens data in Numerical Example 5 in which specific values are used in the zoom lens 5 according to Example 5.

TABLE 13

| Si | Ri | Di | Ni | vi |
|---|---|---|---|---|
| 1 | 104.693 | 1.000 | 1.88100 | 40.14 |
| 2 | 13.288 | 0.100 | 1.53420 | 41.73 |
| 3 (ASP) | 12.000 | 4.547 |  |  |
| 4 | 18.821 | 2.069 | 2.00272 | 19.32 |
| 5 | 28.000 | VARIABLE |  |  |
| 6 (ASP) | 13.539 | 2.216 | 1.69350 | 53.20 |
| 7 (ASP) | 169.553 | 1.800 |  |  |
| 8 (APERTURE STOP) | INFINITY | 0.500 |  |  |
| 9 | 10.117 | 3.293 | 1.49700 | 81.61 |
| 10 | −37.873 | 0.700 | 1.83400 | 37.34 |
| 11 | 8.635 | 1.172 |  |  |
| 12 | 16.439 | 2.237 | 1.48749 | 70.45 |
| 13 | −28.709 | 1.350 |  |  |
| 14 | 25.097 | 1.191 | 1.48749 | 70.45 |
| 15 | 73.700 | VARIABLE |  |  |
| 16 | −36.690 | 0.700 | 1.69680 | 55.46 |
| 17 | 25.023 | 0.150 | 1.53420 | 41.73 |
| 18 (ASP) | 32.262 | VARIABLE |  |  |
| 19 (ASP) | 53.465 | 2.065 | 1.83441 | 37.28 |
| 20 (ASP) | −254.710 | BF |  |  |

In the zoom lens 5, the following surfaces are aspheric surfaces: the image-side surface of the concave meniscus lens L1 in the first lens group G1 (third surface); both surfaces of the convex meniscus lens L3 in the second lens group G2 (sixth and seventh surfaces); the image-side surface of the biconcave lens L8 in the third lens group G3 (eighteenth surface); and both surfaces of the biconvex lens L9 in the fourth lens group G4 (nineteenth and twentieth surfaces).

Table 14 shows the fourth, sixth, eighth, and tenth aspheric coefficients A4, A6, A8, A10 and the conic constant κ of the aspheric surfaces in Numerical Example 5.

TABLE 14

| Si | κ | A4 | A6 | A8 | A10 |
|---|---|---|---|---|---|
| 3 | −1.15808E−01 | −1.54598E−05 | −3.86239E−07 | 2.43671E−09 | −2.25790E−11 |
| 6 | 0.00000E+00 | −1.15409E−05 | 3.13049E−07 | −1.10584E−08 | −8.28589E−11 |
| 7 | 0.00000E+00 | −5.42719E−07 | 4.95889E−07 | −1.97757E−08 | 3.60147E−11 |
| 18 | 2.20221E−01 | 1.03390E−04 | −9.95130E−07 | 1.28987E−09 | 1.71099E−11 |
| 19 | 0.00000E+00 | −7.00000E−05 | 1.00132E−06 | −8.01953E−09 | −1.90801E−11 |
| 20 | 0.00000E+00 | −8.33942E−05 | 7.25326E−07 | −2.80393E−09 | −4.42590E−11 |

When the magnification of the zoom lens 5 is changed between the wide-angle-end state and the telescopic-end state, the following inter-surface distances change: the inter-surface distance D5 between the first lens group G1 and the second lens group G2; the inter-surface distance D15 between the second lens group G2 and the third lens group G3; and the inter-surface distance D18 between the third lens group G3 and the fourth lens group G4.

Table 15 shows the variable inter-surface distances in the wide-angle-end state, the intermediate-focal-position state, and the telescopic-end state along with the f-number Fno and the half viewing angle ω in Numerical Example 5.

TABLE 15

| | Wide angle end | Intermediate focal position | Telescopic end |
|---|---|---|---|
| Fno | 3.61 | 4.78 | 5.78 |
| f | 16.48 | 28.20 | 48.50 |
| ω [°] | 42.42 | 27.02 | 16.33 |
| D5 | 23.943 | 10.217 | 0.800 |
| D15 | 3.195 | 4.486 | 8.975 |
| D18 | 3.090 | 4.950 | 6.350 |

Figure 18:
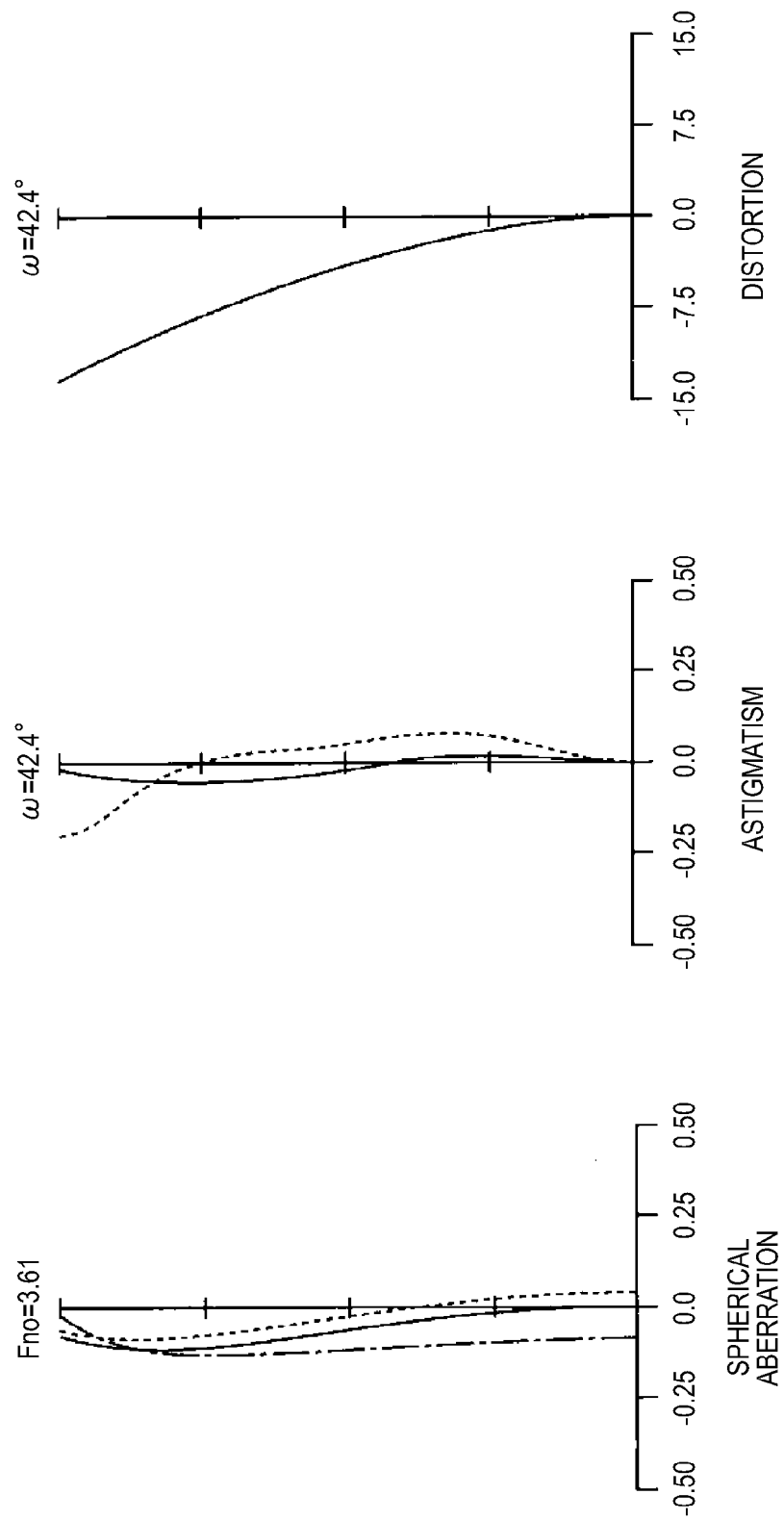
FIG. 18, along with FIGS. 19 and 20, shows aberrations in a numerical example in which specific values are used in Example 5 and shows spherical aberration, astigmatism, and distortion in the wide-angle-end state.
Figure 19:
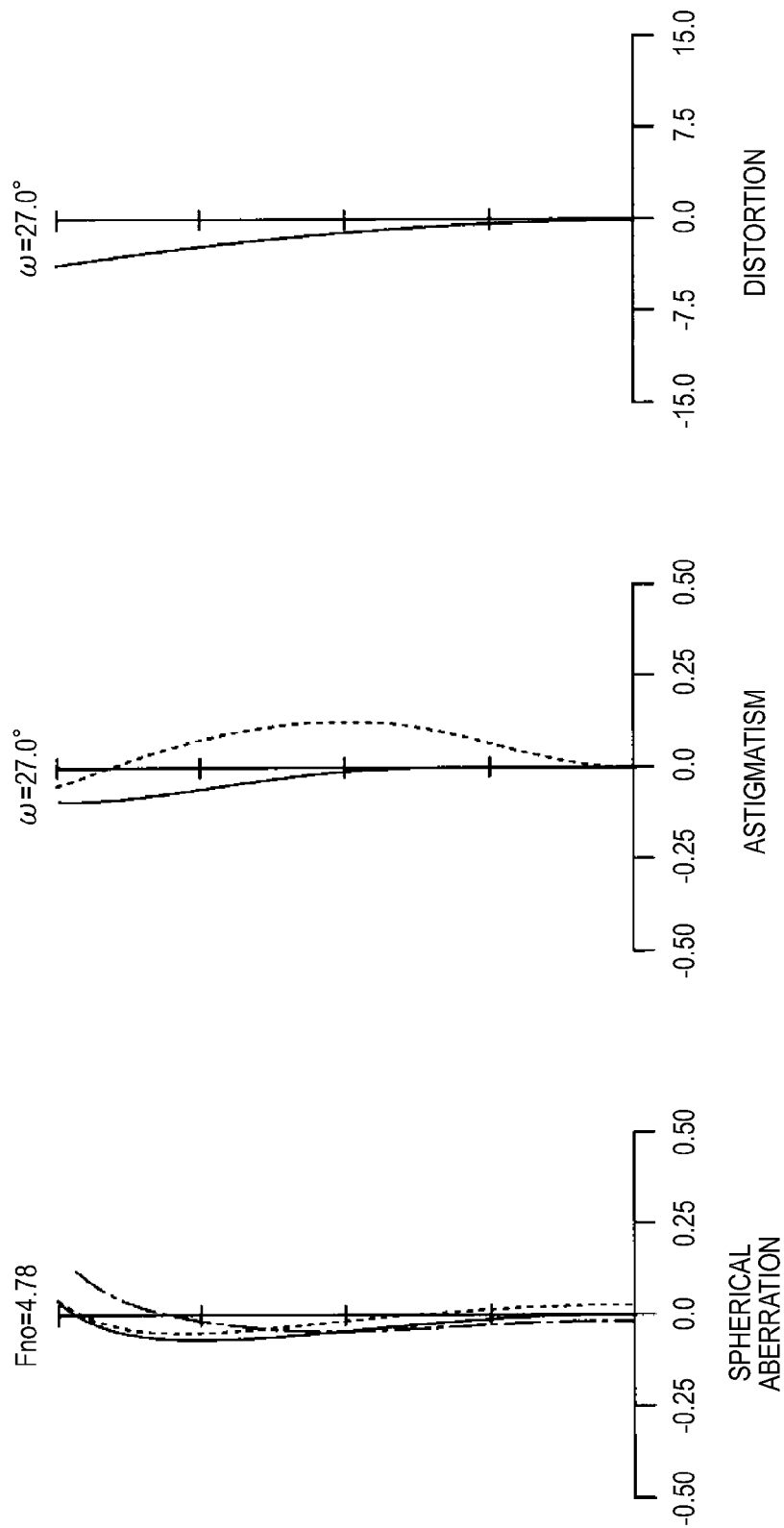
FIG. 19 shows spherical aberration, astigmatism, and distortion in the intermediate-focal-length state.
Figure 20:
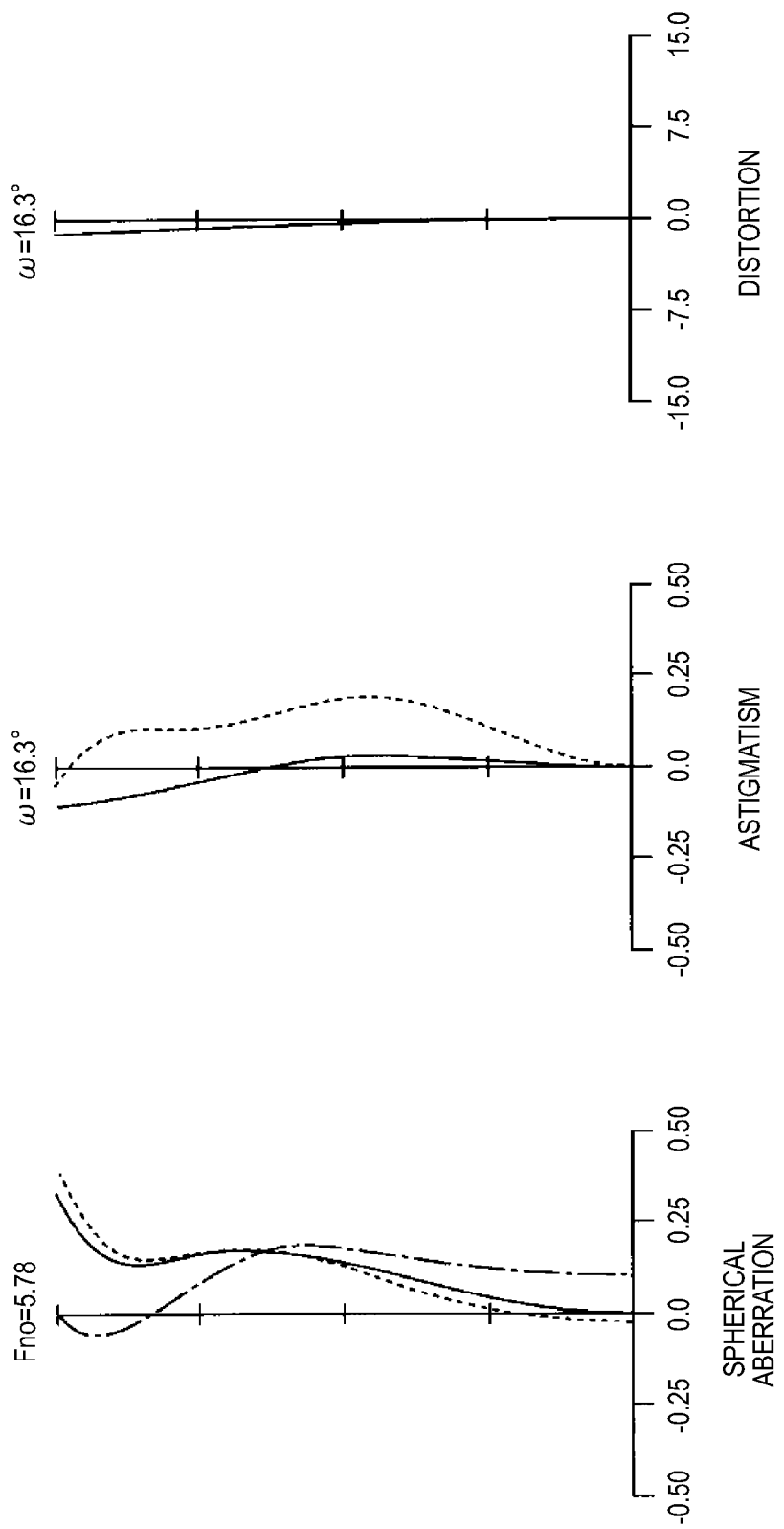
FIG. 20 shows spherical aberration, astigmatism, and distortion in the telescopic-end state.

In the spherical aberration diagrams in FIGS. 18 to 20, the vertical axis represents the proportion with respect to the full-aperture f-number, and the horizontal axis represents the amount of defocus. The solid lines represent spherical aberration values at the d line (587.56 nm), the dotted lines represent spherical aberration values at the C line (wavelength of 656.3 nm), and the chain lines represent spherical aberration values at the g line (wavelength of 435.8 nm). In the astigmatism diagrams in FIGS. 6 to 8, the vertical axis represents the viewing angle, and the horizontal axis represents the amount of defocus. The solid lines represent astigmatism values in the sagittal image plane at the d line, and the broken lines represent astigmatism values in the meridional image plane at the d line. In the distortion diagrams in FIGS. 6 to 8, the vertical axis represents the viewing angle, and the horizontal axis represents %. The solid lines represent distortion values at the d line.

The aberration diagrams clearly show that the aberrations have been well corrected and excellent imaging performance has been achieved in Numerical Example 5.

[Values for Variables in Zoom Lens Conditional Expressions]

A description will be made of values for the variables in the conditional expressions for the zoom lenses according to Examples of the present technology.

Table 16 shows values for the variables in the conditional expressions (1) to (5) for the zoom lenses 1 to 5.

TABLE 16

| | | Example 1 | Example 2 | Example 3 | Example 4 | Example 5 |
|---|---|---|---|---|---|---|
| | f3 | −27.248 | −20.614 | −15.727 | −21.903 | −23.657 |
| | fw | 16.319 | 16.365 | 16.319 | 16.489 | 16.480 |
| | ft | 48.500 | 48.546 | 48.502 | 48.511 | 48.500 |
| Conditional expression (1) | −2.0 < f3/√(fw × ft) < −0.3 | −0.969 | −0.731 | −0.559 | −0.774 | −0.837 |
| | m3 | 17.844 | 18.878 | 12.146 | 16.728 | 16.220 |
| | m4 | 16.844 | 14.739 | 10.294 | 13.150 | 12.960 |
| Conditional expression (2) | 0.5 < m4/m3 < 1.0 | 0.944 | 0.781 | 0.848 | 0.786 | 0.799 |
| | m2 | 22.000 | 21.683 | 17.000 | 22.000 | 22.000 |
| Conditional expression (3) | 0.2 < m2/ft < 0.7 | 0.454 | 0.447 | 0.350 | 0.454 | 0.454 |
| Conditional expression (4) | n12 > 1.90 | 2.00272 | 2.00272 | 2.00272 | 2.00272 | 2.00272 |
| Conditional expression (5) | ν12 < 25 | 19.32 | 19.32 | 19.32 | 19.32 | 19.32 |

FIGS. 18 to 20 are aberration diagrams in Numerical Example 5. FIG. 18 shows aberrations in the state in which an infinite point is brought into focus in the wide-angle-end state. FIG. 19 shows the aberrations in the state in which an infinite point is brought into focus in the intermediate-focal-position state. FIG. 20 shows the aberrations in the state in which an infinite point is brought into focus in the telescopic-end state.

Table 16 clearly shows that the zoom lenses 1 to 5 (Examples 1 to 5) are configured to satisfy the conditional expressions (1) to (5).

[Configuration of Imaging Apparatus]

An imaging apparatus according to an embodiment of the present technology includes a zoom lens formed of a first lens group having negative power, a second lens group having positive power, a third lens group having negative power, and a fourth lens group having positive power sequentially arranged from the object side toward the image side.

In the zoom lens of the imaging apparatus according to the embodiment of the present technology, when the magnification at the wide angle side is changed to the magnification at the telescopic side, the lens groups are moved as follows: the first lens group is so moved along the optical axis that the distance between the first lens group and the second lens group decreases; the second lens group, the third lens group, and the fourth lens group are moved from the image side toward the object side; and the third lens group is moved along the optical axis for focusing.

Moving the third lens group for focusing as described above allows size reduction of an entire focusing group including an actuator for focusing operation because the third lens group is a small-diameter lens group on which low-height light rays are incident in positions close to the optical axis.

Further, in the imaging apparatus according to the embodiment of the present technology, the zoom lens satisfies the following conditional expression (1):

$$-2.0 < f3/\sqrt{(fw \times ft)} < -0.3 \tag{1}$$

where f3 represents the focal length of the third lens group, fw represents the focal length of the entire lens system at the wide angle end, and ft represents the focal length of the entire lens system at the telescopic end.

The conditional expression (1) defines the focal length of the third lens group.

When $f3/\sqrt{(fw \times ft)}$ is smaller than the lower limit of the conditional expression (1), the power of the third lens group becomes too small, resulting in an increase in the focusing stroke and hence an increase in the total optical length. In particular, in a collapsible-type imaging apparatus, the total length thereof increases in a state in which the zoom lens is retracted and no size reduction is achieved.

Further, when the focusing stroke of the third lens group increases, it is necessary to increase the drive force of the actuator for focusing operation, resulting in an increase in the size of the actuator for focusing operation, which prevents size reduction of the entire focusing group including the actuator for focusing operation.

Conversely, when $f3/\sqrt{(fw \times ft)}$ is greater than the upper limit of the conditional expression (1), the negative power of the third lens group becomes too large, it is difficult to correct aberrations produced in the third lens group.

Further, when $f3/\sqrt{(fw \times ft)}$ is greater than the upper limit of the conditional expression (1), the sensitivity to decentering increases, resulting in a decrease in high-volume productivity.

Moreover, when $f3/\sqrt{(fw \times ft)}$ is greater than the upper limit of the conditional expression (1), what is called focusing sensitivity, which is the travel of an image on the image plane with respect to the travel of the third lens group along the optical axis, becomes too high, resulting in a difficulty in performing focusing control that satisfies necessary focusing precision.

As described above, when the zoom lens of the imaging apparatus satisfies the conditional expression (1), not only can satisfactory imaging performance and high-speed, smooth focusing performance suitable for motion picture imaging be ensured but also size reduction can be achieved.

In the present technology, the numerical range of the conditional expression (1) is more preferably changed to the range of the following conditional expression (1)':

$$-1.6 < f3/\sqrt{(fw \times ft)} < -0.5. \tag{1'}$$

When the range of the conditional expression (1)' is satisfied, more satisfactory imaging performance and higher-speed, smoother focusing performance suitable for motion picture imaging can be ensured and further size reduction can be achieved.

In the present technology, the numerical range of the conditional expression (1) is still more preferably changed to the range of the following conditional expression (1)":

$$-1.2 < f3/\sqrt{(fw \times ft)} < -0.5. \tag{1"}$$

When the range of the conditional expression (1)" is satisfied, still more satisfactory imaging performance and still higher-speed, smoother focusing performance suitable for motion picture imaging can be ensured and still greater size reduction can be achieved.

Embodiment of Imaging Apparatus

Figure 21:
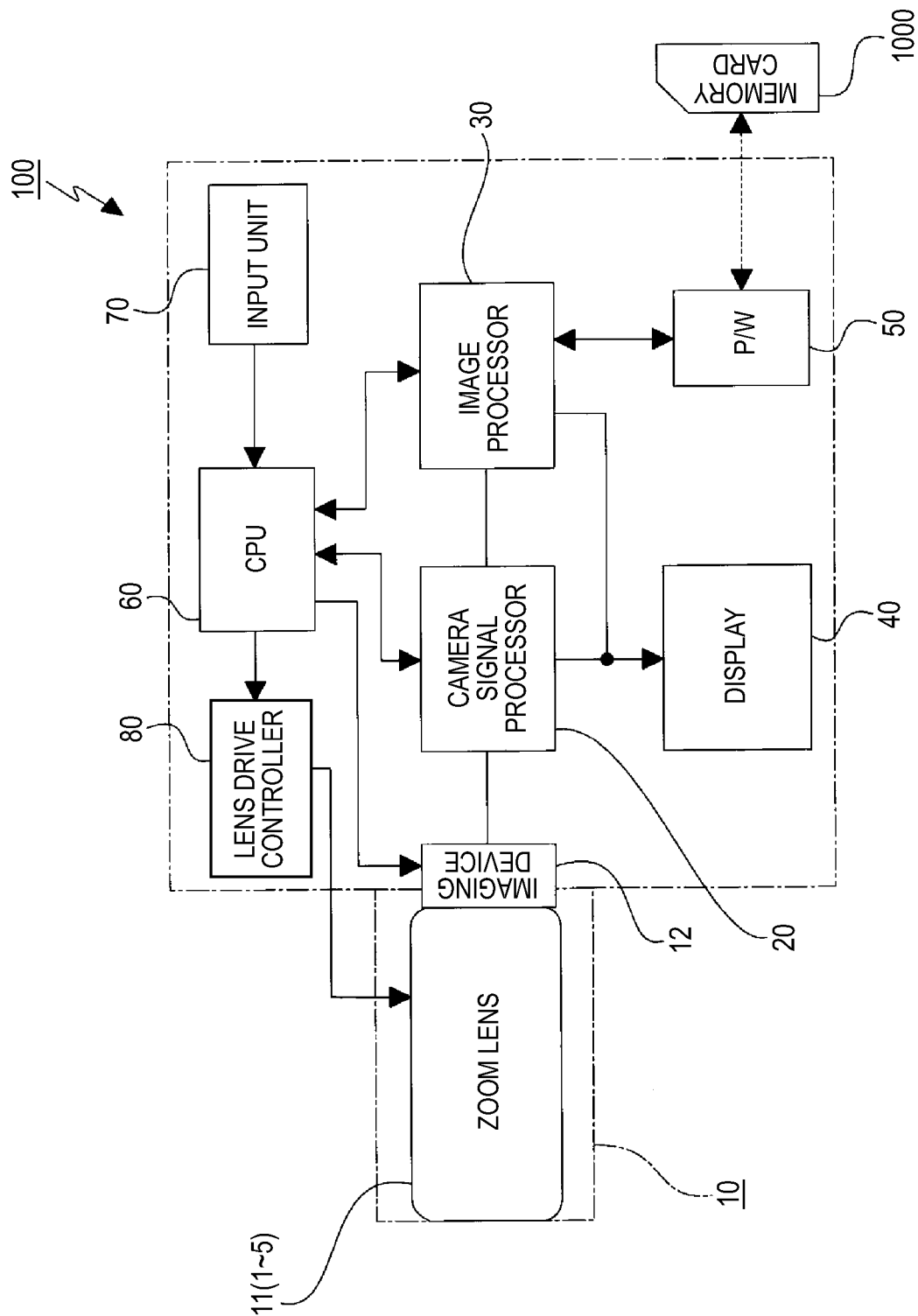
FIG. 21 is a block diagram showing an example of an imaging apparatus.

FIG. 21 is a block diagram showing an interchangeable-lens-type digital camera as an imaging apparatus according to an embodiment of the present technology.

An imaging apparatus (digital camera) 100 includes a camera block 10 responsible for imaging capability, a camera signal processor 20 that performs analog-digital conversion and other types of signal processing on a captured image signal, and an image processor 30 that records and reproduces the resultant image signal. The imaging apparatus 100 further includes a display 40, such as an LCD (liquid crystal display), which displays a captured image and other information, a R/W (reader/writer) 50 that writes and reads the image signal to and from a memory card 1000, a CPU (central processing unit) 60 that controls the entire imaging apparatus, an input unit 70 formed of a variety of switches and other components operated by a user as necessary, and a lens drive controller 80 that controls driving of lenses disposed in the camera block 10.

The camera block 10 is disposed, for example, in an interchangeable lens and formed of an optical system including a zoom lens 11 (any of the zoom lenses 1, 2, 3, 4, and 5 to which the present technology is applied), an imaging device 12, such as a CCD (charge coupled device) and a CMOS (complementary metal oxide semiconductor) device, and other components.

The camera single processor 20 converts an output signal from the imaging device 12 into a digital signal, performs noise removal and image quality correction, converts the digital signal into brightness/color difference signals, and performs a variety of other types of signal processing.

The image processor 30 performs compression encoding and decompression decoding on an image signal based on a predetermined image data format, performs data specification conversion, such as resolution conversion, and performs other types of image processing.

The display 40 has a function of displaying a variety of data, such as user's operation via the input unit 70 and captured images.

The R/W 50 writes image data encoded by the image processor 30 to the memory card 1000 and reads image data recorded on the memory card 1000.

The CPU 60 functions as a control processor that controls circuit blocks provided in the imaging apparatus 100 and controls each of the circuit blocks based, for example, on an instruction input signal from the input unit 70.

The input unit 70 is formed, for example, of a shutter release button for shutter operation and a selection switch for selecting an action mode and outputs an instruction input signal according to user's operation to the CPU 60.

The lens drive controller 80 controls a motor or any other actuator (not shown) that drives lenses in the zoom lens 11 based on a control signal from the CPU 60.

The memory card 1000 is, for example, a semiconductor memory that can be attached and detached to and from a slot connected to the R/W 50.

The action of the imaging apparatus 100 will next be described.

In an imaging standby state, an image signal captured by the camera block 10 is outputted to the display 40 via the camera single processor 20 and displayed as a camera-through image on the display 40 under the control of the CPU 60. Further, when a zooming instruction input signal is inputted from the input unit 70, the CPU 60 outputs a control signal to the lens drive controller 80, and a predetermined lens in the zoom lens 11 is moved under the control of the lens drive controller 80.

When a shutter (not shown) in the camera block 10 is operated in response to an instruction input signal from the input unit 70, the camera signal processor 20 outputs a captured image signal to the image processor 30, which performs compression encoding on the image signal and converts the encoded image signal into digital data expressed in a predetermined data format. The converted data is outputted to the R/W 50, which writes the data to the memory card 1000.

Focusing is carried out, for example, as follows: when the shutter release button on the input unit 70 is pressed halfway or fully pressed for recording (imaging), the lens drive controller 80 moves a predetermined lens in the zoom lens 11 based on a control signal from the CPU 60.

To reproduce image data recorded on the memory card 1000, predetermined image data is read from the memory card 1000 via the R/W 50 in response to user's operation performed through the input unit 70. The image processor 30 performs decompression decoding on the read image data, and an image signal to be reproduced is then outputted to the display 40 and displayed thereon as a reproduced image.

The above description has been made with reference to the case where the imaging apparatus is used as an interchangeable-lens-type digital camera, but the imaging apparatus is not necessarily used as an interchangeable-lens-type digital camera. The imaging apparatus can be widely used, for example, as a camera unit in a digital input/output apparatus, such as a digital still camera, a digital video camcorder, a mobile phone in which a camera is incorporated, and a PDA (personal digital assistant) in which a camera is incorporated.

[Others]

In any of the zoom lenses according to the embodiments of the present technology and the imaging apparatus according to the embodiment of the present technology, a lens with no power, an aperture stop, and other optical elements may be disposed as well as the first to fourth lens groups. In this case, the lens configuration of the zoom lens according to any of the embodiments of the present technology is a four-group lens configuration formed of the first to fourth lens groups.

[Present Technology]

The present technology can also be configured as follow.

<1> A zoom lens including a first lens group having negative power, a second lens group having positive power, a third lens group having negative power, and a fourth lens group having positive power sequentially arranged from an object side toward an image side, wherein when the magnification at a wide angle side is changed to the magnification at a telescopic side, the first lens group is so moved along an optical axis that the distance between the first lens group and the second lens group decreases, and the second lens group, the third lens group, and the fourth lens group are moved from the image side toward the object side, the third lens group is moved along the optical axis for focusing, and the zoom lens satisfies the following conditional expression (1):

$$-2.0 < f3/\sqrt{(fw \times ft)} < -0.3 \quad (1)$$

where f3 represents the focal length of the third lens group, fw represents the focal length of the entire lens system at the wide angle end, and ft represents the focal length of the entire lens system at the telescopic end.

<2> The zoom lens described in <1>, wherein the zoom lens satisfies the following conditional expression (2):

$$0.5 < m4/m3 < 1.0 \quad (2)$$

where m3 represents the amount over which the third lens group travels when the magnification at the wide angle end is changed to the magnification at the telescopic end, and m4 represents the amount over which the fourth lens group travels when the magnification at the wide angle end is changed to the magnification at the telescopic end.

<3> The zoom lens described in <1> or <2>, wherein the third lens group is formed of a single lens having at least one aspheric surface.

<4> The zoom lens described in any of <1> to <3>, wherein the zoom lens satisfies the following conditional expression (3):

$$0.2 < m2/ft < 0.7 \quad (3)$$

where m2 represents the amount over which the second lens group travels when the magnification at the wide angle end is changed to the magnification at the telescopic end.

<5> The zoom lens described in any of <1> to <4>, wherein the first lens group is formed of a negative lens and a positive lens sequentially arranged from the object side toward the image side.

<6> The zoom lens described in any of <1> to <5>, wherein the zoom lens satisfies the following conditional expressions (4) and (5):

$$n12 > 1.90 \quad (4)$$

$$v12 < 25 \quad (5)$$

where n12 represents the refractive index of the positive lens in the first lens group at the d line, and v12 represents the Abbe number of the positive lens in the first lens group at the d line.

<7> The zoom lens described in any of <1> to <6>, wherein the lower limit of the conditional expression (1) is −1.6 and the upper limit of the conditional expression (1) is −0.5.

<8> The zoom lens described in any of <1> to <6>, wherein the lower limit of the conditional expression (1) is −1.2 and the upper limit of the conditional expression (1) is −0.5.

<9> The zoom lens described in any of <1> to <8>, wherein the lower limit of the conditional expression (2) is 0.7.

<10> The zoom lens described in any of <1> to <9>, wherein the lower limit of the conditional expression (3) is 0.3 and the upper limit of the conditional expression (3) is 0.5.

<11> An imaging apparatus including a zoom lens and an imaging device that converts an optical image formed by the zoom lens into an electric signal, wherein the zoom lens includes a first lens group having negative power, a second lens group having positive power, a third lens group having negative power, and a fourth lens group having positive power sequentially arranged from an object side toward an image side, when the magnification at a wide angle side is changed to the magnification at a telescopic side, the first lens group is so moved along an optical axis that the distance between the first lens group and the second lens group decreases, and the second lens group, the third lens group, and the fourth lens group are moved from the image side toward the object side, the third lens group is moved along the optical axis for focusing, and the zoom lens satisfies the following conditional expression (1):

$$-2.0<f3/\sqrt{(fw \times ft)}<-0.3 \qquad (1)$$

where f3 represents the focal length of the third lens group, fw represents the focal length of the entire lens system at the wide angle end, and ft represents the focal length of the entire lens system at the telescopic end.

<12> The zoom lens described in any of <1> to <10> or the imaging apparatus described in <11>, wherein an optical element including a lens having substantially no lens power is further disposed.

The shapes and values of the components shown in Examples described above are all presented only by way of example for implementing the present technology and should not be used to construe the technical range of the present technology in a limited sense.

The present disclosure contains subject matter related to that disclosed in Japanese Priority Patent Application JP 2012-052721 filed in the Japan Patent Office on Mar. 9, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
a first lens group having negative power;
a second lens group having positive power;
a third lens group having negative power; and
a fourth lens group having positive power sequentially arranged from an object side toward an image side,
wherein when a magnification at a wide angle side is changed to a magnification at a telescopic side, the first lens group is so moved along an optical axis that a distance between the first lens group and the second lens group decreases, and the second lens group, the third lens group, and the fourth lens group are moved from the image side toward the object side,
the third lens group is moved along the optical axis for focusing, and
the zoom lens satisfies the following conditional expression (1)

$$-2.0<f3/\sqrt{(fw \times ft)}<-0.3, \qquad (1)$$

where f3 represents the focal length of the third lens group, fw represents a focal length of the entire lens system at the wide angle end, and ft represents the focal length of the entire lens system at the telescopic end.

2. The zoom lens according to claim 1,
wherein the zoom lens satisfies the following conditional expression (2)

$$0.5<m4/m3<1.0 \qquad (2)$$

where m3 represents the amount over which the third lens group travels when the magnification at the wide angle end is changed to the magnification at the telescopic end, and m4 represents the amount over which the fourth lens group travels when the magnification at the wide angle end is changed to the magnification at the telescopic end.

3. The zoom lens according to claim 2,
wherein the lower limit of the conditional expression (2) is 0.7.

4. The zoom lens according to claim 1,
wherein the third lens group is formed of a single lens having at least one aspheric surface.

5. The zoom lens according to claim 1,
wherein the zoom lens satisfies the following conditional expression (3)

$$0.2<m2/ft<0.7 \qquad (3)$$

where m2 represents the amount over which the second lens group travels when the magnification at the wide angle end is changed to the magnification at the telescopic end.

6. The zoom lens according to claim 5,
wherein the lower limit of the conditional expression (3) is 0.3 and the upper limit of the conditional expression (3) is 0.5.

7. The zoom lens according to claim 1,
wherein the first lens group is formed of a negative lens and a positive lens sequentially arranged from the object side toward the image side.

8. The zoom lens according to claim 7,
wherein the zoom lens satisfies the following conditional expressions (4) and (5)

$$n12>1.90 \qquad (4)$$

$$v12<25 \qquad (5)$$

where n12 represents the refractive index of the positive lens in the first lens group at the d line, and v12 represents the Abbe number of the positive lens in the first lens group at the d line.

9. The zoom lens according to claim 1,
wherein the lower limit of the conditional expression (1) is −1.6 and the upper limit of the conditional expression (1) is −0.5.

10. The zoom lens according to claim 1,
wherein the lower limit of the conditional expression (1) is −1.2 and the upper limit of the conditional expression (1) is −0.5.

11. An imaging apparatus comprising:
a zoom lens; and
an imaging device that converts an optical image formed by the zoom lens into an electric signal,
wherein the zoom lens includes a first lens group having negative power, a second lens group having positive power, a third lens group having negative power, and a fourth lens group having positive power sequentially arranged from an object side toward an image side,
when a magnification at a wide angle side is changed to a magnification at a telescopic side, the first lens group is so moved along an optical axis that a distance between the first lens group and the second lens group decreases, and the second lens group, the third lens group, and the fourth lens group are moved from the image side toward the object side,
the third lens group is moved along the optical axis for focusing, and
the zoom lens satisfies the following conditional expression (1)

$$-2.0<f3/\sqrt{(fw \times ft)}<-0.3, \qquad (1)$$

where f3 represents the focal length of the third lens group, fw represents a focal length of the entire lens system at the wide angle end, and ft represents the focal length of the entire lens system at the telescopic end.

12. The imaging apparatus according to claim 11, wherein the zoom lens satisfies the following conditional expression (2)

$$0.5 < m4/m3 < 1.0 \qquad (2)$$

where m3 represents the amount over which the third lens group travels when the magnification at the wide angle end is changed to the magnification at the telescopic end, and m4 represents the amount over which the fourth lens group travels when the magnification at the wide angle end is changed to the magnification at the telescopic end.

13. The imaging apparatus according to claim 12, wherein the lower limit of the conditional expression (2) is 0.7.

14. The imaging apparatus according to claim 11, wherein the third lens group is formed of a single lens having at least one aspheric surface.

15. The imaging apparatus according to claim 11, wherein the zoom lens satisfies the following conditional expression (3)

$$0.2 < m2/ft < 0.7 \qquad (3)$$

where m2 represents the amount over which the second lens group travels when the magnification at the wide angle end is changed to the magnification at the telescopic end.

16. The imaging apparatus according to claim 15, wherein the lower limit of the conditional expression (3) is 0.3 and the upper limit of the conditional expression (3) is 0.5.

17. The imaging apparatus according to claim 11, wherein the first lens group is formed of a negative lens and a positive lens sequentially arranged from the object side toward the image side.

18. The imaging apparatus according to claim 17, wherein the zoom lens satisfies the following conditional expressions (4) and (5)

$$n12 > 1.90 \qquad (4)$$

$$v12 < 25 \qquad (5)$$

where n12 represents the refractive index of the positive lens in the first lens group at the d line, and v12 represents the Abbe number of the positive lens in the first lens group at the d line.

19. The imaging apparatus according to claim 11, wherein the lower limit of the conditional expression (1) is −1.6 and the upper limit of the conditional expression (1) is −0.5.

20. The imaging apparatus according to claim 11, wherein the lower limit of the conditional expression (1) is −1.2 and the upper limit of the conditional expression (1) is −0.5.

\* \* \* \* \*